US011868936B2

(12) United States Patent
Dahn et al.

(10) Patent No.: US 11,868,936 B2
(45) Date of Patent: Jan. 9, 2024

(54) SYSTEMS AND METHODS FOR WORKFLOW AND PRACTICE MANAGEMENT

(71) Applicant: Thomson Reuters Enterprise Centre GmbH, Zug (CH)

(72) Inventors: Mike Dahn, Farmington, MN (US); Shelly Albaum, Sebastopol, CA (US); Brian C. Quinn, Saint Paul, MN (US); David Rawson, Kirk Smeaton (GB); Chris Hendry, Hertz (GB); Damien Riehl, Saint Paul, MN (US); Emily Colbert, Garden City, NY (US); Scott Francis, Prior Lake, MN (US); Colleen Scimeca, Chicago, IL (US)

(73) Assignee: THOMSON REUTERS ENTERPRISE CENTRE GMBH, Zug (CH)

( * ) Notice: Subject to any disclaimer, the term of this patent is extended or adjusted under 35 U.S.C. 154(b) by 49 days.

(21) Appl. No.: 15/603,269

(22) Filed: May 23, 2017

(65) Prior Publication Data

US 2017/0364845 A1    Dec. 21, 2017

Related U.S. Application Data

(60) Provisional application No. 62/340,634, filed on May 24, 2016.

(51) Int. Cl.
*G06Q 10/0633* (2023.01)
*G06Q 10/10* (2023.01)
*G06Q 10/00* (2023.01)
*G06F 40/186* (2020.01)

(52) U.S. Cl.
CPC ....... *G06Q 10/0633* (2013.01); *G06F 40/186* (2020.01); *G06Q 10/00* (2013.01); *G06Q 10/10* (2013.01)

(58) Field of Classification Search
None
See application file for complete search history.

(56) References Cited

U.S. PATENT DOCUMENTS

| 2003/0149714 A1 | 8/2003 | Casati et al. |
| 2006/0167735 A1 | 7/2006 | Ward |
| 2006/0259524 A1* | 11/2006 | Horton ............... G06F 17/2288 |
| 2009/0125831 A1 | 5/2009 | Dandurand |

(Continued)

OTHER PUBLICATIONS

University of Washington, High Performance Scientific Computing, 2013, entire page (Year: 2013).*

(Continued)

*Primary Examiner* — Rutao Wu
*Assistant Examiner* — Zahra Elkassabgi
(74) *Attorney, Agent, or Firm* — Alston & Bird LLP

(57) ABSTRACT

The present disclosure is directed towards systems and methods for workflow and practice management that are particularly useful to professional service industries. The inventive systems and methods provide tools for planning a matter or project, executing a matter or project and analyzing the success or failure of a matter or project. Templates are developed to provide organizational and task execution assistance while at the same time providing detailed information for performance analytics tools.

13 Claims, 21 Drawing Sheets

(56) References Cited

U.S. PATENT DOCUMENTS

| | | | |
|---|---|---|---|
| 2012/0072268 A1* | 3/2012 | Ritter | G06Q 10/06 705/7.39 |
| 2014/0114992 A1* | 4/2014 | Buford | G06F 16/90 707/755 |
| 2015/0161627 A1 | 6/2015 | Sarmenta et al. | |
| 2016/0224939 A1* | 8/2016 | Chen | G06Q 10/107 |
| 2017/0169520 A1* | 6/2017 | Cornet | G06Q 40/125 |

OTHER PUBLICATIONS

International Search Report and Written Opinion for International Application No. PCT/US2017/034067 dated Aug. 2, 2017, 9 pages.
$1^{st}$ Examination Report for New Zealand Application No. 748799 dated Nov. 5, 2021 (4 pages).
Examiner's Report for Canadian Application No. 3,025,515 dated Jan. 26, 2023 (7 pages).
$1^{st}$ Examination Report for Canadian Application No. 3,025,515 dated Jan. 20, 2022 (5 pages).
International Preliminary Report on Patentability for PCT/US2017/034067 dated Dec. 6, 2018 (7 pages).
$2^{nd}$ Patent Examination Report for NZ Patent Application No. 748799 dated Jun. 1, 2022 (9 pages).
Wikipeida API, "Api.ph" redirects here. [retrieved from Internet on Jun. 28, 2022] https://en.wikipedia.org/wiki/API.
Binary Encoding—an overview, Science Direct [retrieved from Internet on Jun. 28, 2022] https://www.sciencedirect.com/topics/engineering/binary-encoding.
Extended European Search Report for European Application No. 17803453.4 dated Nov. 8, 2019.

\* cited by examiner

1. Customize a Best-Practices Matter Plan
2. Import Your Existing Play Books
3. Create Your Own Matter Plans from Scratch

Fig. 11

7. Capture Your Own Best Practices

The system gets smarter each time you do a deal by capturing variations in process that can be considered by subsequent deal teams.

Original Work Plan

Handling Federal Contracts
- ☐ Is target a federal contractor?
- ☐ Determine number of primary contracts
- ☐ Is novation definitely required (asset deal)?
- ☐ Is novation possibly required (stock deal)?
- ☐ Notify contracting officer for each contract
- ☐ Gather required documentation for each novation
- ☐ Prepare reassurances of performance for each novation
- ☐ Submit three copies of each novation request (often closed)

As Executed

Handling Federal Contracts
- ☐ Is target a federal contractor?
- ☐ Determine number of primary contracts
- ☐ Is novation definitely required (asset deal)?
- ☐ Is novation possibly required (stock deal)?
- ☐ Did target qualify as Small Business federal contractor?
- ☐ If target is no longer an SB is renewal likelihood reduced?
- ☐ Notify subcontractors that target no longer counts toward SB goals
- ☐ Identify contracting officer for each contract
- ☐ Gather required documentation for each novation
- ☐ Prepare reassurances of performance for each novation
- ☐ Submit three copies of each novation request (often closed)

Small Business regulatory issues that came up in this deal will automatically be remembered for the next deal

Fig. 12

Attorneys as receptors – When to promote options, content?

Information provided during "receptive times" is a combination of firm assets and TR assets – adding validity to the TR offerings 1. Brief Bank
2. E-mail
3. Discovery documents
4. Deposition testimony and interrogatories
5. Current Awareness
6. Practical Law Checklists
7. Practical Law Notes
8. Foldered Research (Cases, Statutes)
9. Relevant non-research TR documents

Fig. 16

SYSTEMS AND METHODS FOR WORKFLOW AND PRACTICE MANAGEMENT

CROSS-REFERENCE TO RELATED APPLICATIONS

This application claims the benefit of and priority to U.S. Provisional Application No. 62/340,634, filed May 24, 2016, which is hereby incorporated by reference in its entirety.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address tools for enhancing workflow management in a way that is designed to maximize efficiency, profitability and quality of work product. Although the tools described in the present application are described as being tailored for use in a law firm environment, it will be understood that the same tools have applicability in other industries in which deadlines, estimates, repetition of similar tasks and phases of projects, and varying levels of seniority and experience in the workforce, etc. are a factor. For example, construction management, accounting, marketing, etc. all are industries involving these factors and industries in which the presently described tools may be employed.

Businesses are under increased pressure to obtain more services for less cost from their suppliers. Those suppliers, in turn, are under pressure to provide those services more cost effectively while maintaining the same level of quality and are also under their own pressures to maintain and improve their own profitability. Accordingly, there is a need for systems and tools to manage workflows of service providers to increase efficiency, quality and profitability at every opportunity.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The present innovations generally address systems and methods for managing the workflow and practice of service providers as they carry out their work.

In general, in one embodiment, a method for managing workflow of a service provider comprises receiving a project template specifying one or more tasks to be performed by one or more service providers in connection with a first project, providing a prompt to at least one of the one or more service providers to perform a particular task specified by the project template, recognizing the nature of the particular task and providing to the at least one service provider a related resource to assist in the completion of the task, and receiving an indication from the at least one service provider that the task has been completed and storing an update to a factual matrix that the task has been completed by the at least one service provider.

In some implementations, the method further comprises receiving a time entry from said at least one service provider specifying an amount of time devoted to performing the particular task and storing the time entry in a time entry database. In some implementations, the method further comprises receiving an indication from a user related to the commencement of a second project, analyzing whether the second project is similar to the first project, and if the second project is similar to the first project, based on the time entries stored in the time entry database in connection with the first project, providing to the user an indication of service providers who entered time in connection with the first project.

In some implementations, the method further comprises prompting a user to answer one or more questions related to a nature of the first project, receiving answers to the questions from the user, and applying logic to the answers to create the project template. In some implementations, the method further comprises storing the answers in the factual matrix.

In some implementations, the method further comprises receiving an indication from a user related to the commencement of a second project, analyzing whether the second project is similar to the first project, and if the second project is similar to the first project, providing the project template related to the first project to the user in connection with the second project.

In some implementations, the task is related to drafting a document and the method further comprises providing to the at least one service provider a template of the document to be drafted in a word processing tool, and providing an add-in within the word processing tool to assist the at least one service provider to draft the document. In some implementations, the add-in is configured to provide to the user an indication of how the document being drafted relates to at least one of the task and the project template. In some implementations, the add-in is configured to assist with the creation of a time entry associated with the drafting of the document. In some implementations, the add-in is configured to recognize the nature of content of the document and to recommend at least one resource to the at least one service provider related to the content of the document.

In some implementations, the method further includes providing the prompt and providing the related resource are steps performed at least in part by a web server providing content to a web browser.

In some implementations, the method further includes receiving an indication of a change in an external fact, analyzing whether the external fact is a basis for an aspect of the project template and whether the change in the external fact requires a change to the project template, and if a change to the project template is determined to be required, notifying at least one of the one or more service providers about the required change.

BRIEF DESCRIPTION OF THE DRAWINGS

The accompanying drawings illustrate various non-limiting, example, innovative aspects in accordance with the present descriptions:

Figure 11:
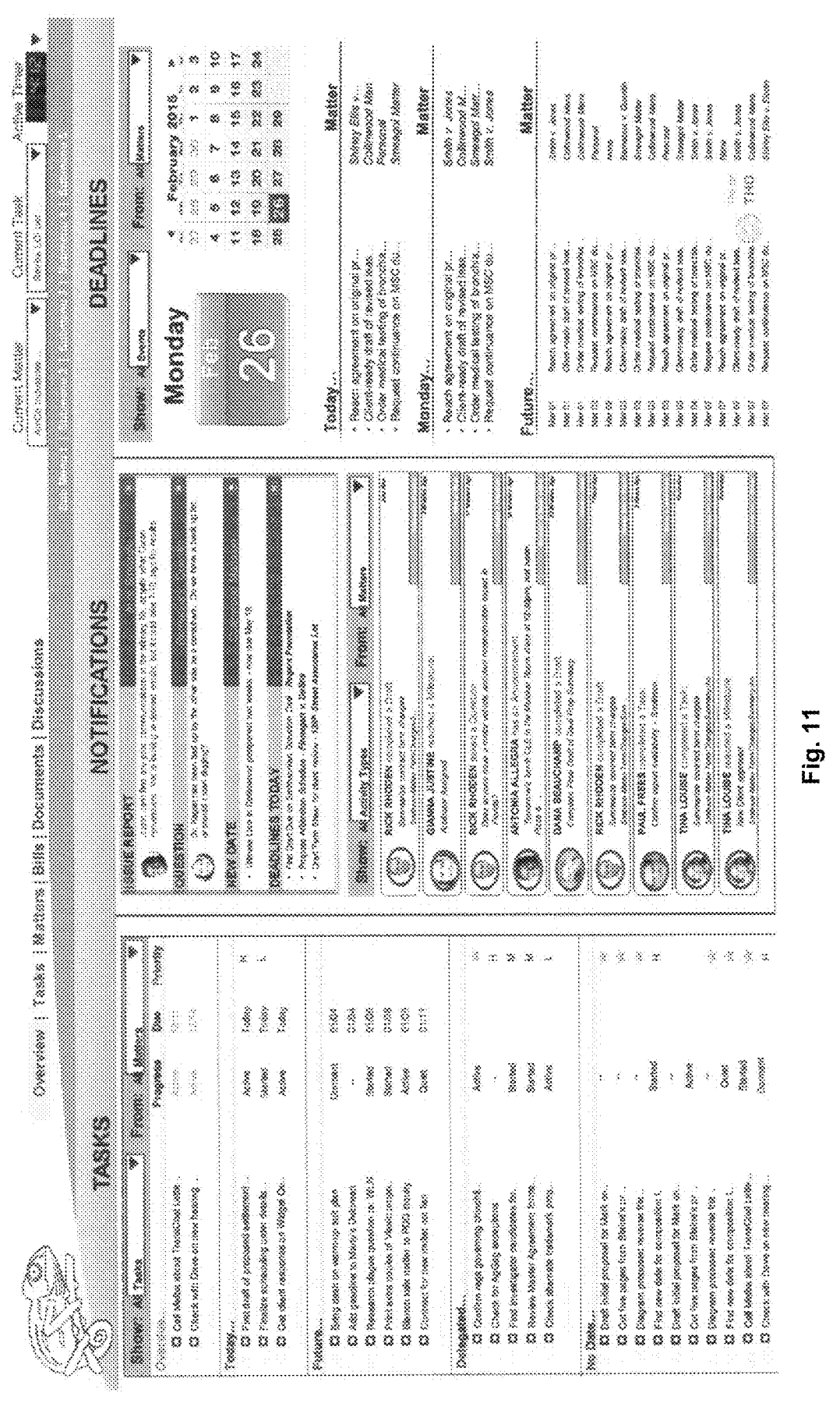

FIG. 11 shows an illustration of an exemplary display provided to a user according to embodiments of a workflow and practice management system.

FIG. 12 shows an illustration of matter plan revision according to embodiments of a workflow and practice management system.

FIG. 16 shows an illustration of exemplary content recommendation tools according to embodiments of a workflow and practice management system.

DETAILED DESCRIPTION

Figure 1:
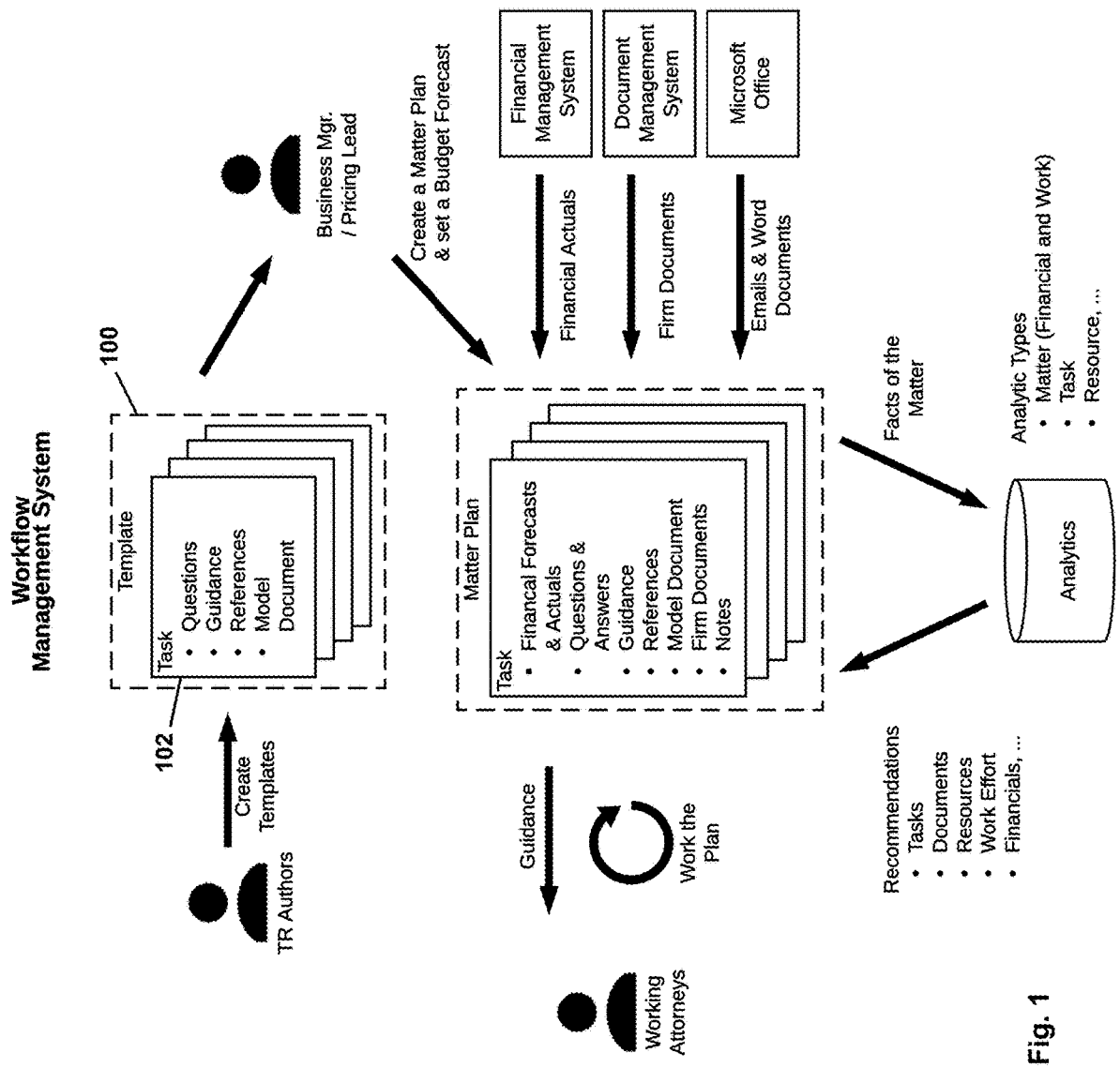
FIG. 1 shows a block diagram illustrating embodiments of a workflow management system.

Embodiments of systems and methods for workflow and practice management are described herein. While aspects of the described workflow and practice management systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive workflow and practice management systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

In general, the systems and methods described herein may relate to aspects and/or a complete lifecycle of the work of a service-oriented profession such as the legal profession. For example, they may relate to the start of a new project, such as its substantive planning, pricing, budgeting and staffing. They also may relate to the execution of projects and making sure that the necessary components of the project are executed properly, efficiently and in a manner that reflects the service provider's internal and external knowledge base about how such a project should be executed based on their previous experiences and the previous experiences of others. In addition, the systems and methods may relate to post-completion analysis of how projects were forecast or planned and also how they were executed, both from a budgetary and profitability perspective and also from a substantive efficacy perspective.

In one embodiment, the systems and methods described herein provide a global cloud-based workflow management system that connects task management with pricing and budgeting. The systems described herein help service providers organize, prioritize, allocate, and analyze their work needed while optionally providing just-in-time guidance on how to proceed. Each matter plan may map out many tasks and subtasks and it is possible to be made dynamic when fed into an application configured for such purpose. Within the application, a service provider can work this matter plan through the task-based system, with the facts of their matter determining what step or guidance is relevant next. The application may track and remember their activity, getting smarter with each use. As service providers perform their work through the system, rich analytics are generated and tied to financial data.

The systems provided herein are intended to increase profitability and productivity with answers at every stage of a matter. Today, service providers are under intense pressure to deliver more for less, while adapting to new business and valuation models. It allows service providers to predict what work will be profitable and provide better service to their clients through dynamic matter plans recommending precedential documents based on prior work.

A. Planning New Projects

In many professional service industries, projects follow a general flow from task to task during the lifetime of the project. From project to project, these flows and tasks are often repeated in a similar way. With repetition comes experience and recursive learning of how to better accomplish such projects and tasks in the future based on past experiences. However, not all projects are exactly alike and differences and changed external factors must continually be taken into account. Nevertheless, it is helpful to create a record or template of project flows, not only to help plan future work, but also to help assess performance of a project after it is completed to gain insight on how it might be better or more profitably performed in the future. An exemplary workflow management system is shown generally in FIG. 1.

Templates 100 may be created on one or more levels. For example, a template may be created for a particular task 102, such as drafting a complaint for a lawsuit. On a broader scale, a template may be created for a larger matter or project, such as a litigation claiming patent infringement in district court. One template may include another template by reference. Thus, taking the previous examples one step further, a template for a patent litigation may include within it a reference to a template for the task of drafting a complaint. It should be noted that such a hierarchical system of templates is not bound in the number of levels it may comprise. In addition, tasks may also have a hierarchical system in which tasks may comprise one or more levels of subtasks. Each task and subtask may or may not be associated with a template. Task (and subtask) templates may include, for example, one or more of financial forecasts and actuals, questions and answers, guidance, references, model documents, firm documents and notes. One or more components of a template may be provided internally or by a third party provider.

Figure 6:
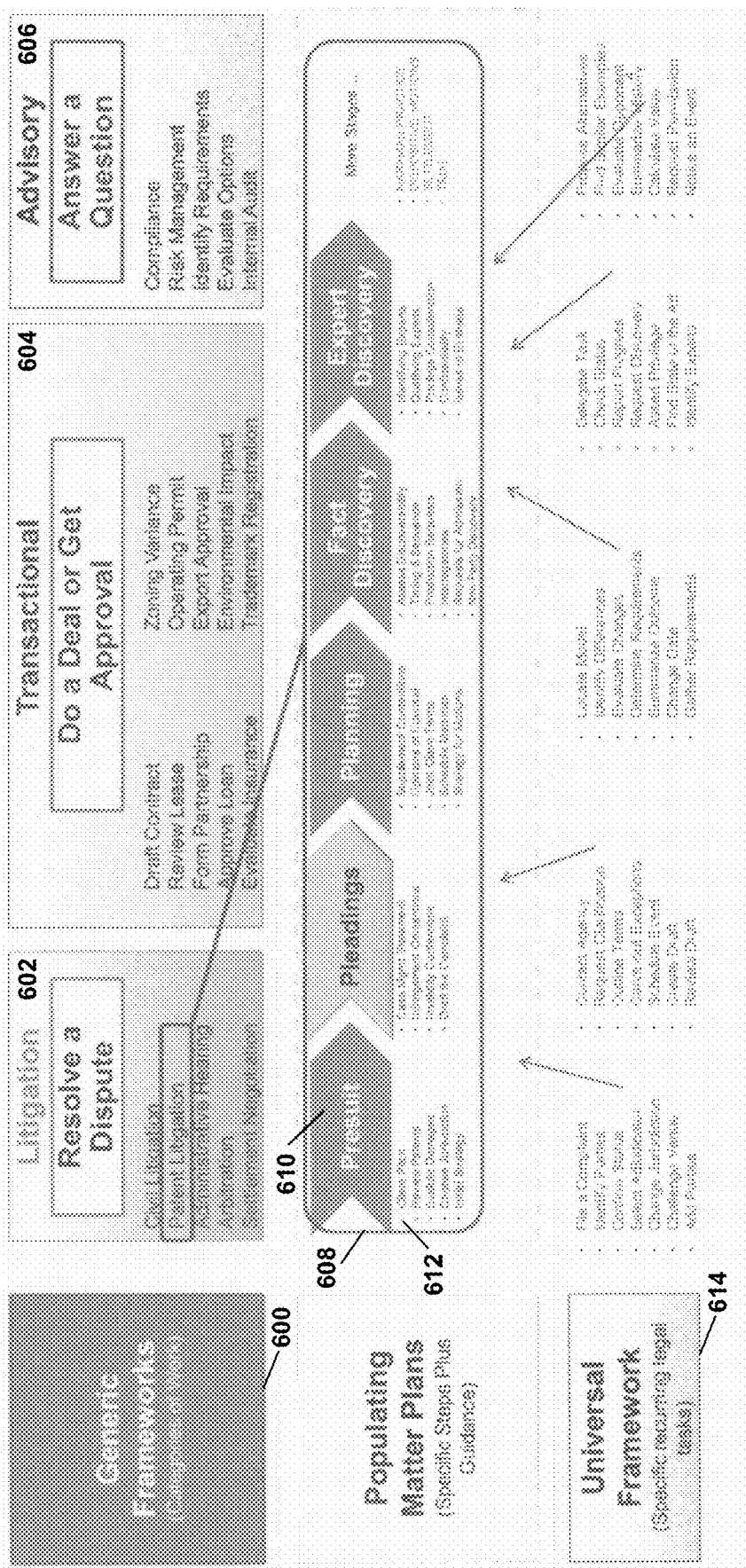
FIG. 6 shows an illustration of exemplary frameworks according to embodiments of a workflow and practice management system.
Figure 7:
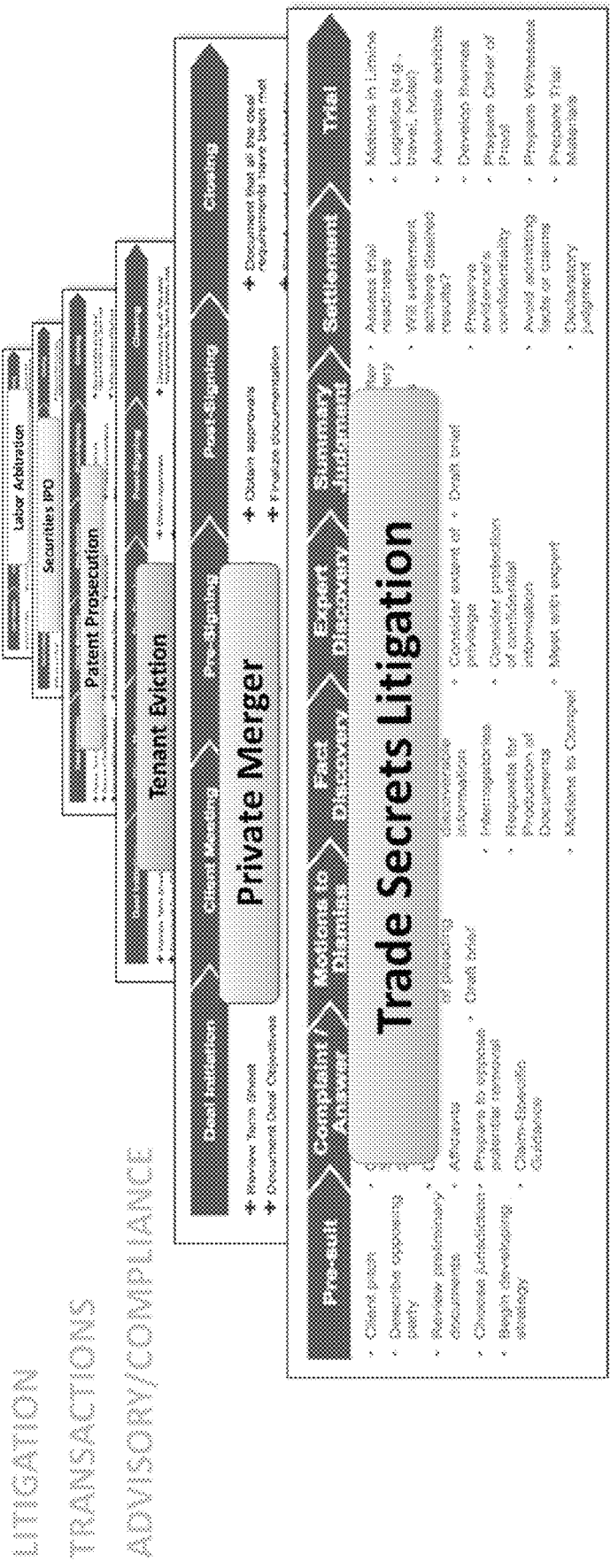
FIG. 7 shows an illustration of exemplary matter plans according to embodiments of a workflow and practice management system.

Projects generally may be categorized as fitting within certain frameworks that are specific to the relevant industry. FIG. 6 shows an illustration of exemplary frameworks. For example, in the legal industry, some different generic frameworks 600 may include litigation 602, transactional 604 and advisory project 606 frameworks. Within each of these frameworks, categories of projects may be more specifically delineated. For example, within a litigation framework, a project may be further categorized as civil commercial litigation, patent litigation, an administrative hearing, an arbitration, a settlement negotiation, etc. As another example, within a transactional framework, a project may be further categorized as drafting a contract, reviewing a lease, forming a partnership, approving a loan, evaluating insurance, drafting an environmental impact statement or obtaining a zoning variance, operating permits, export approval or trademark registration, etc. As a further example, within an advisory framework, a project may be further categorized as compliance, risk management, identifying legal requirements, evaluating legal options, internal audit, etc.

Taking the particular example of a patent litigation within a litigation framework, a template or matter plan 608 may be created anew or recalled from computer memory to guide the execution of the patent litigation. Such a template may include, for example, tasks that should be completed as a part of the project (and templates for those tasks), document templates or examples of previous documents that will need to be completed in furtherance of the project, billing details and guidance based on past experiences with similar projects, etc. In the example of a patent litigation, for instance, a template 608 for such a project may include templates for the tasks 612 involved in the different phases 610 of the project, such as a pre-suit investigation phase, a pleadings drafting phase, a planning phase, a fact discovery phase, an expert discovery phase, a Markman (claim construction) phase, one or more dispositive motion phases, a settlement phase, a trial phase, an appeal phase, etc. For each phase, templates may be provided or created for tasks typically involved in that phase. For example, in the pre-suit phase of a patent litigation, templates may be included for the tasks of creating a client pitch, reviewing the patents to be litigated, evaluating damages, choosing a jurisdiction, and developing an initial strategy.

While some projects may be associated with a particular framework (and by association phases and tasks specific to that framework), in many industries, there are phases and tasks that may be applicable to projects regardless of what specific framework is applicable. In other words, a project may be associated with a specific framework and it may also be associated with a universal framework 614. Taking the example again of a patent litigation, while it can be associated with a litigation framework that includes phases and tasks specific to a patent litigation as described above, it may also be associated with a universal framework for the legal profession. Such a universal framework may include tasks that are broadly applicable to legal projects. For example, such a universal framework may include task templates for scheduling events, creating and reviewing a draft, drafting a summary of the outcome of an event for a client, etc.

Figure 2:
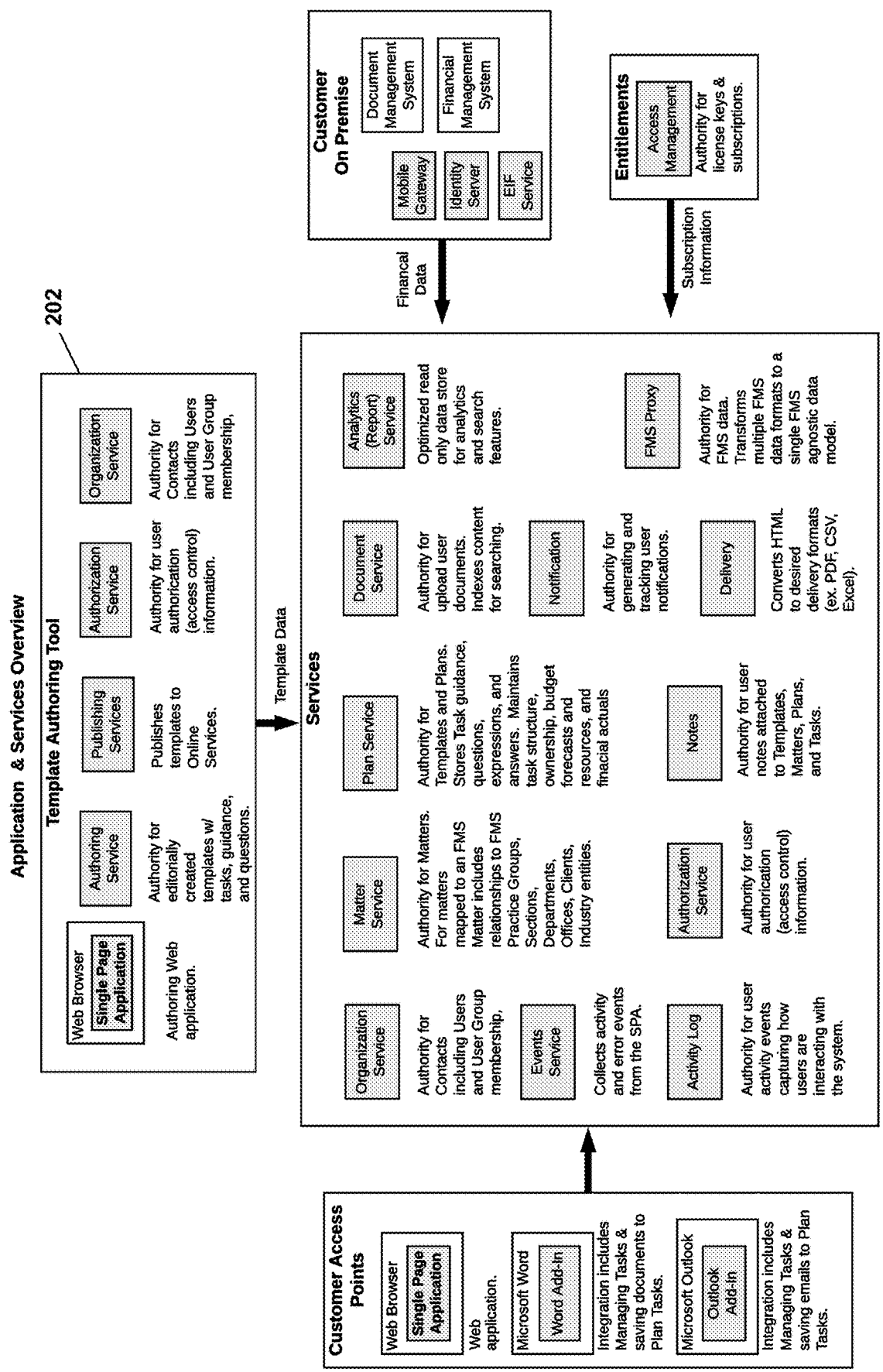
FIG. 2 shows a block diagram illustrating an application and services overview of embodiments of a workflow and practice management system.
Figure 3:
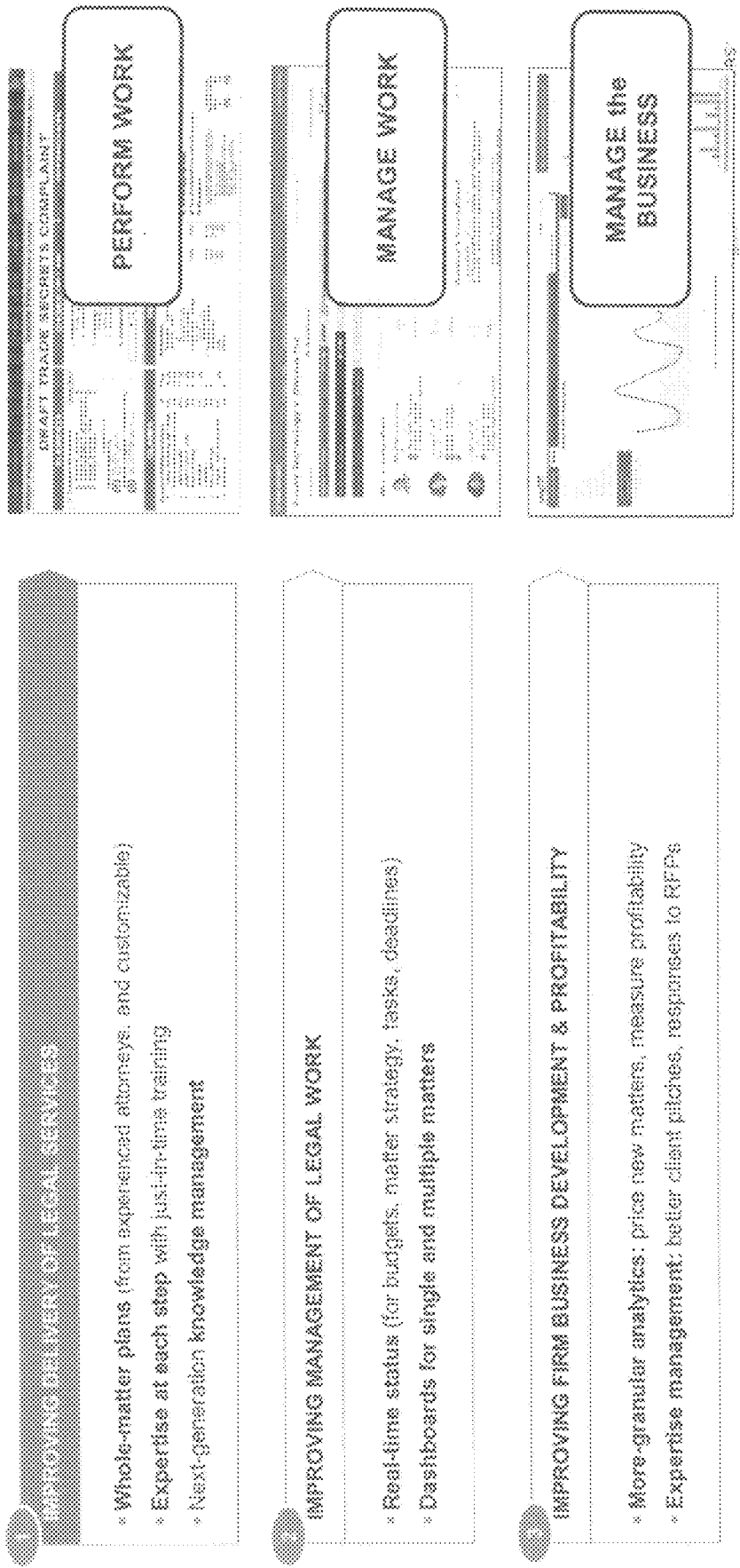
FIG. 3 shows an illustration of various aspects and benefits of embodiments of a workflow and practice management system, in an exemplary application to a law practice.

FIG. 2 shows a block diagram illustrating an application and services overview. In one example, templates may be configured using a template authoring tool 202. In one embodiment, a template authoring tool may be provided as a single page application that is viewable in a web browser. Template authoring tools may include any one or more of an authoring service, a publishing service, an authorization service and an organization service. An authoring service may provide authority for editorially created templates with tasks, guidance and questions. A publishing service may publish templates that are created to an online platform. An authorization service may provide authority for users to access templates and template authoring tools. An organization service may provide authority for contacts, including users and user group membership.

In another embodiment, templates may be provided by and/or obtained from a third party. In one example, such a third party could provide templates to more than one user of the inventive system. In such an example, the content of the templates would be shared with multiple users, however the content and any edits to the template provided by each user in connection with those templates would be strictly segregated and kept confidential from other users sharing the underlying template. In this way, for example, the confidential and potentially privileged work product of one user would not be shared with a different user.

Regardless of how they are created or obtained, task templates may be aggregated for a project or matter into a plan or template for that project or matter. In the examples described above of various specific and universal project frameworks, tasks may be included in those frameworks as a "menu" of sorts from which the planner for the project may select the tasks applicable to the particular project or matter at hand. In another example, such a plan population activity may be guided interactively by providing tips or suggestions for how best to populate the plan for a project. Such suggestions may be made at the outset of a project and/or during execution of a project. For example, if a planner is compiling a plan for the defense of a patent litigation and proceeds past the initial phases of the litigation (has added one or more initial tasks to the plan) without adding tasks relating to Inter Partes Review, the inventive system may prompt the planner to reconsider whether such tasks may be beneficial to add to the plan. Included within such a suggestion may be statistics or other background information intended to assist the planner in deciding whether to include such a task in their plan. Such information (including parameters indicating whether and/or when to provide such a prompt) may be based upon prior plans executed or compiled by the same planner (or client or law firm) or may also be based on larger scale data, for example, the success rates of all Inter Partes Review challenges for a particular patent subject matter. In another example, a client of the service provider may specify as a part of their billing guidelines or otherwise that they must be provided with weekly updates on the status of a matter. In such an instance, a recurring task may be added to the matter plan as a default or the inventive system may prompt a planner to add such a task to any plan associated with that client.

In another example, the inventive system may prompt a planner to add a task based on prior activity in a matter having similar characteristics to the matter at hand. One example is shown in FIG. 12. In another example, if a planner is compiling a matter plan for a patent litigation in a particular jurisdiction, and the last time that the law firm litigated a case in that district, they added a task to the matter plan part way through the litigation to consult with a local jury consultant, then in the matter currently being planned, the inventive system may prompt the planner to consider adding such a task to the new plan from the outset. In addition, the details of the previously used consultant may also be provided in the template for that task as a starting point for completing the task in the new litigation. As an example, such prior information could include not only the consultant's contact information, but also their billing information, a review of their involvement in the prior matter, a summary of any public information obtainable through a web search or database search, etc.

Figure 8:
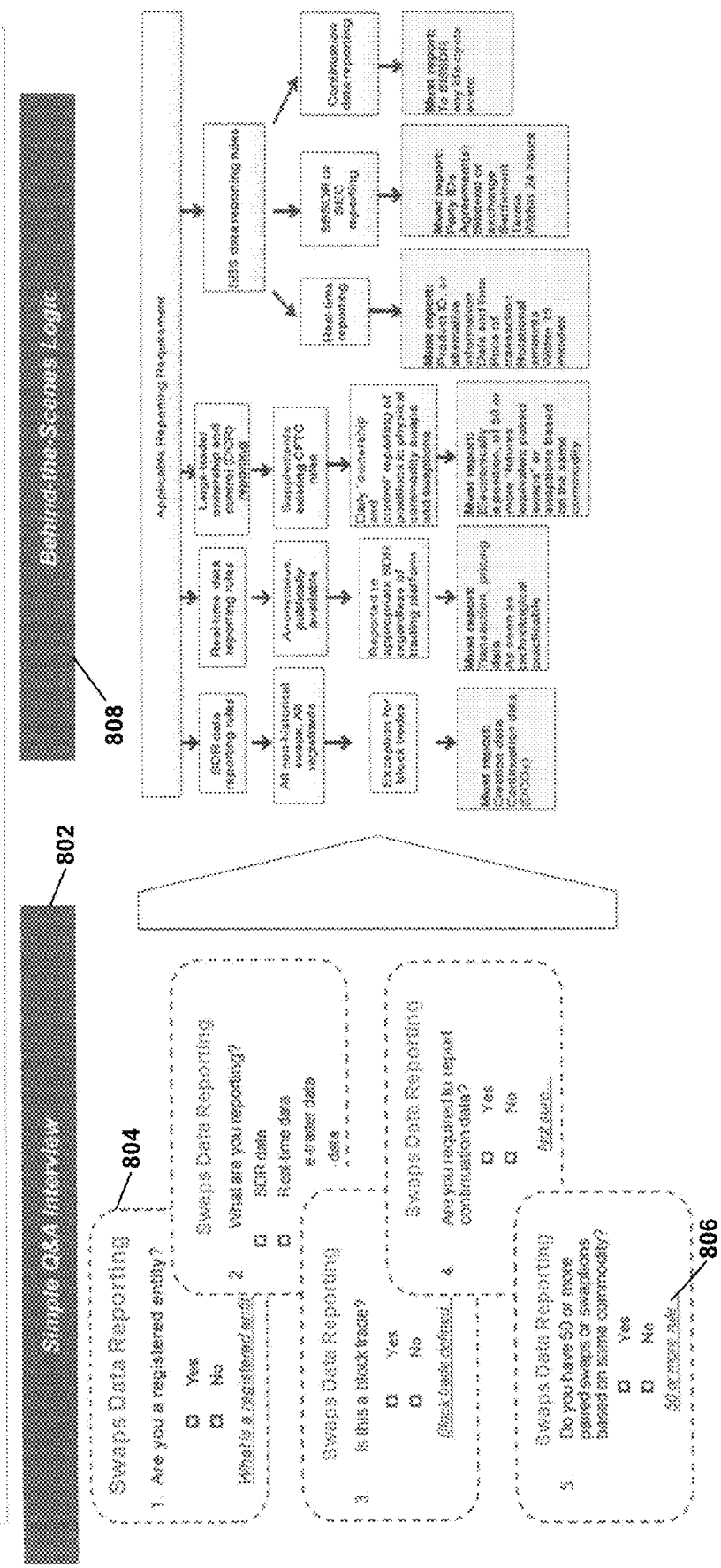
FIG. 8 shows an illustration of a questionnaire according to embodiments of a workflow and practice management system.

In another embodiment, a matter plan may be compiled by the inventive system through an intelligent questionnaire presented to the matter planner. For example, as shown generally in FIG. 8, in the case of a swaps regulation compliance matter, a questionnaire or interview 802 may be presented to the planner to guide them through the planning and execution of the matter. Such a questionnaire may be compiled by the planner themselves at some prior time, by another person at the firm, or by a third party. The questionnaire may be updated as time goes by with new developments in the law or with new requirements by the client. Returning to the example of a swaps regulation compliance matter, a questionnaire for establishing a matter plan may begin with questions 804 such as whether the reporting entity is regulated, what is the nature of the information to be reported, etc. In some examples, all of the questions are presented in such a way as having discrete answers selectable from a list of options (e.g., yes/no and multiple choice questions). In such an example, ambiguity may be avoided and a logic may be applied to the answers to obtain an appropriate resulting matter plan. The system may also be configured to accept and use provisional answers in the event that matter planners are not completely sure of the answer to a question. In this case, planners may be prompted as the matter progresses (for example, based on entries in a matter's factual matrix) to reevaluate their provisional answers or assumptions and, if necessary adjust the matter plan accordingly if their answer changes based on new or more clear information. For each question, informational prompts or links 806 may also be provided to guide the planner in answering the question. For example, if a question asks whether the trade being reported is a "block trade," a link maybe provided to pop up an informational window explaining what a "block trade" is. In another example, a question may be presented along with a short summary of why the question is being asked and/or what the ramifications would be if the question was answered one way or another. For example, if a question is presented asking whether 50 or more swaps or swaptions are to be reported for the same underlying commodity, a link may be provided giving an explanation of the "50 or more rule" underlying the question.

Based on the answers given to the various questions presented, a matter plan may be formulated based on predefined logic 808. Such questions may be conditionally and interactively presented. For example, a particular question may only be presented if the answer to another prior question is a certain value. In addition, a matter plan questionnaire or other matter plan monitoring service may be continually updated based on developments in the law or client requirements and may be configured to prompt matter planners or service providers executing the plan with additional questions even after the questionnaire is initially completed. For example, if a new regulation is enacted after a matter plan is created, a question may be presented to the planner or another person executing the matter plan to ascertain whether the new regulation is applicable to the matter and whether a change in the matter plan is required in order to satisfy the new regulation. Such a question may be drafted and promulgated by third party service engaged to provide such real-time monitoring of applicable external developments.

In addition to substantive tasks to be carried out in executing a matter, budgetary and other internal or administrative considerations may also be included in a matter plan. For example, as a matter plan is developed and customized to fit a particular matter, a planner may also include in the matter plan an estimate of time needed to complete each task as well as an assignment of an internal or external service provider to complete each task. As will be discussed in more detail below, information may be compiled and analyzed by the inventive system based on past performance to assist in the planning of such administrative aspects of a matter plan.

To assist with setting up a budget and/or pricing strategy for a project, the inventive system provides the ability to compare various budget scenarios based on an intelligent use of previously completed projects having similar characteristics. The system may be configured to retrieve prior matters or projects by comparing one or more attributes of the project currently being planned with the same or similar attributes of past matters or projects to gather relevant historical data. Such attributes may include, for example, the client for whom the work is being done, the type of project or matter, the tasks involved in the matter plan, the service providers staffed on the matter or project, the fee type to be used, the practice group that will be working on the matter or project, etc. Once all matching prior matters or projects are identified (exact and/or close matches), they may be summarized by calculating various descriptive averages and/or other statistics. For example, the values for the $10^{th}$, $50^{th}$ and $90^{th}$ percentiles of any one or more of the cost, duration, revenue, net revenue, hours, staff and blended rate for the relevant prior matters or projects may be output to the planner of the current matter or project. Each of the relevant prior matters may be listed in a way that permits sorting by any relevant category.

The relevant prior matters returned as a result of such a search may also be used as a basis for developing the budget for the current matter or project being planned. For example, the budget of a similar prior project (or the average or other aggregation of similar prior projects' budgets) may be used as the basis of a template for the budget or budget items of the current project being planned. Using such a template, or starting from scratch, the system provides the planner the capability to develop a budget specifically tailored to the current project. For example, the system allows the planner to assign personnel, set billing rates, estimate the service providers' hours for each phase of the project, estimate timing of phases, etc. After a budget is drafted, or during the drafting of a budget, the system may be configured to provide a comparison tool configured to compare the budget being drafted to the relevant prior projects, either individually or in comparison to an average of the relevant prior projects. For example, the system may be configured to indicate the percentile ranking of the current budget being planned in terms of estimated net revenue (or any other aspect) compared to all relevant prior projects.

Figure 10:
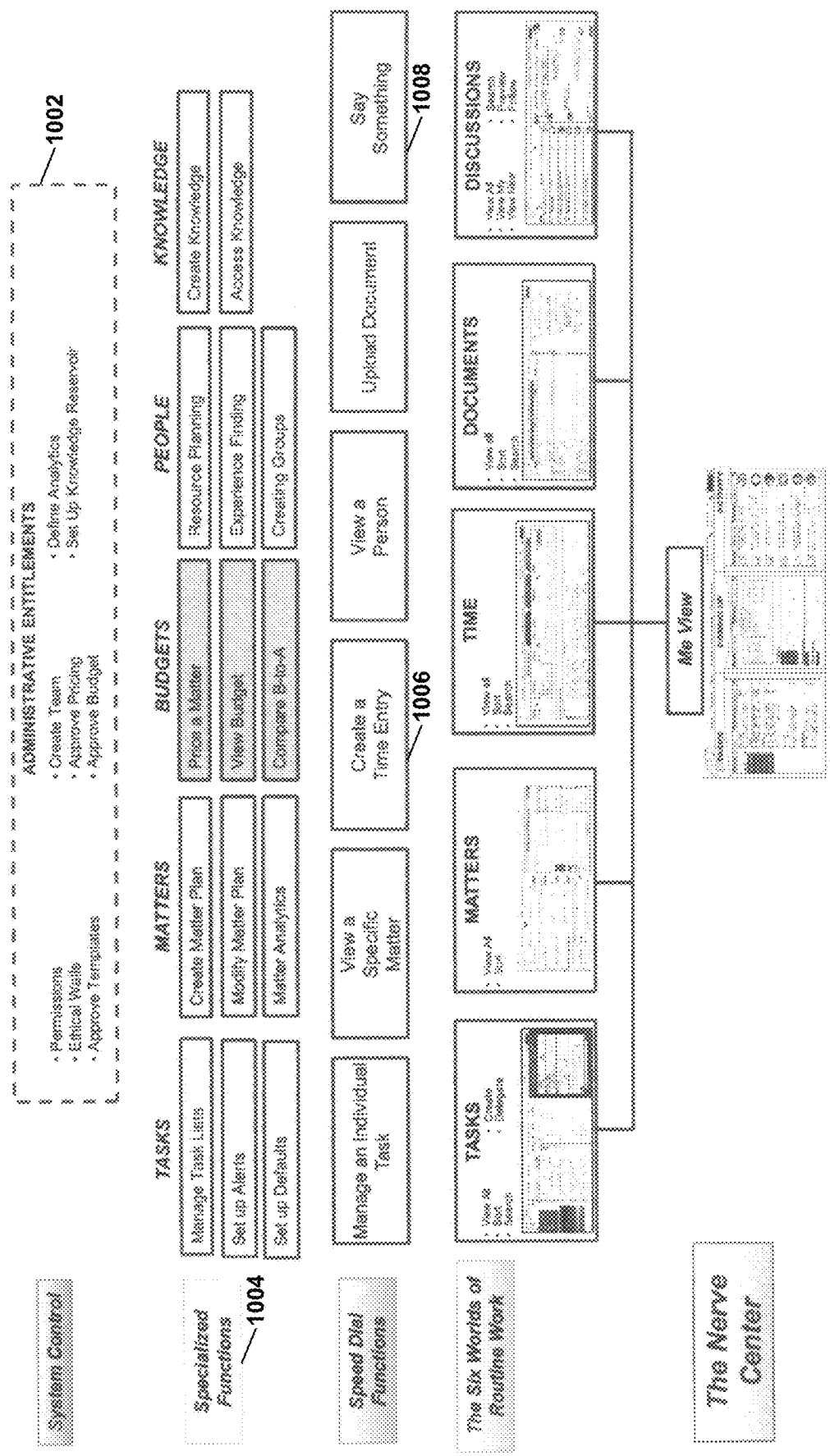
FIG. 10 shows an illustration of exemplary functions and tools provided by embodiments of a workflow and practice management system.
Figure 13:
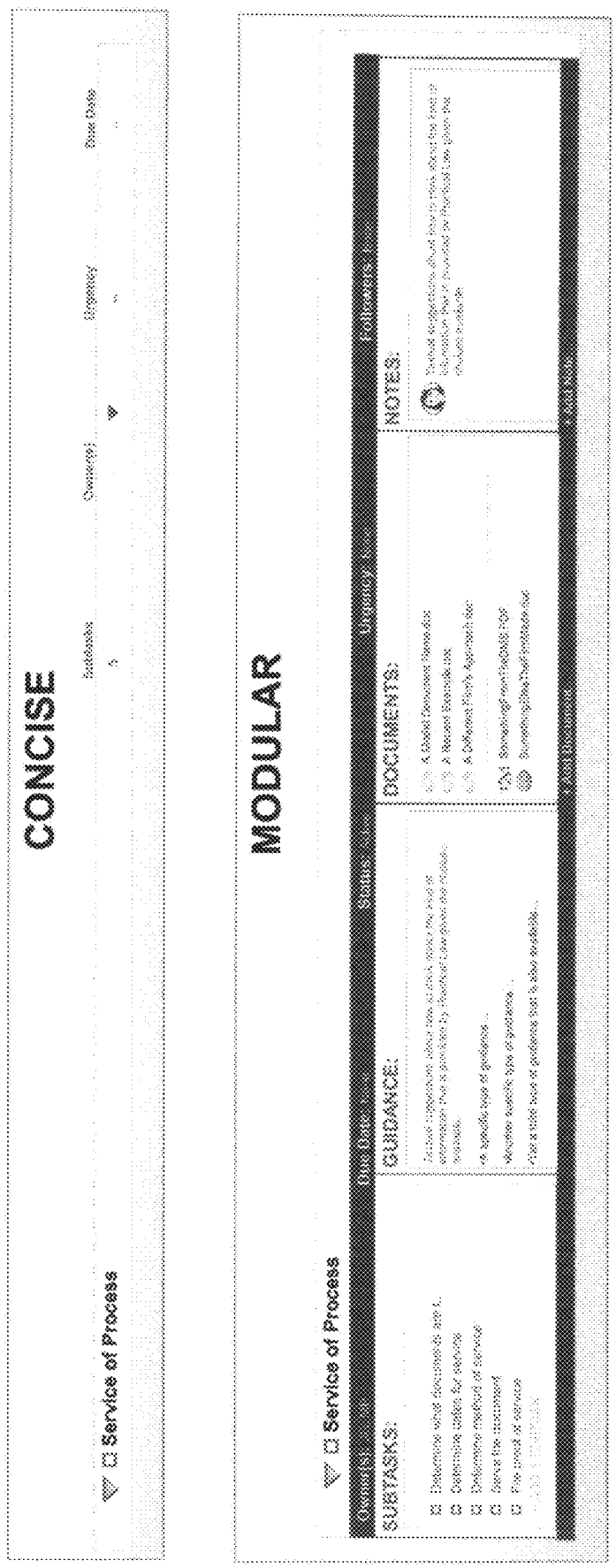
FIG. 13 shows an illustration of exemplary views provided to a user by embodiments of a workflow and practice management system.
Figure 14:
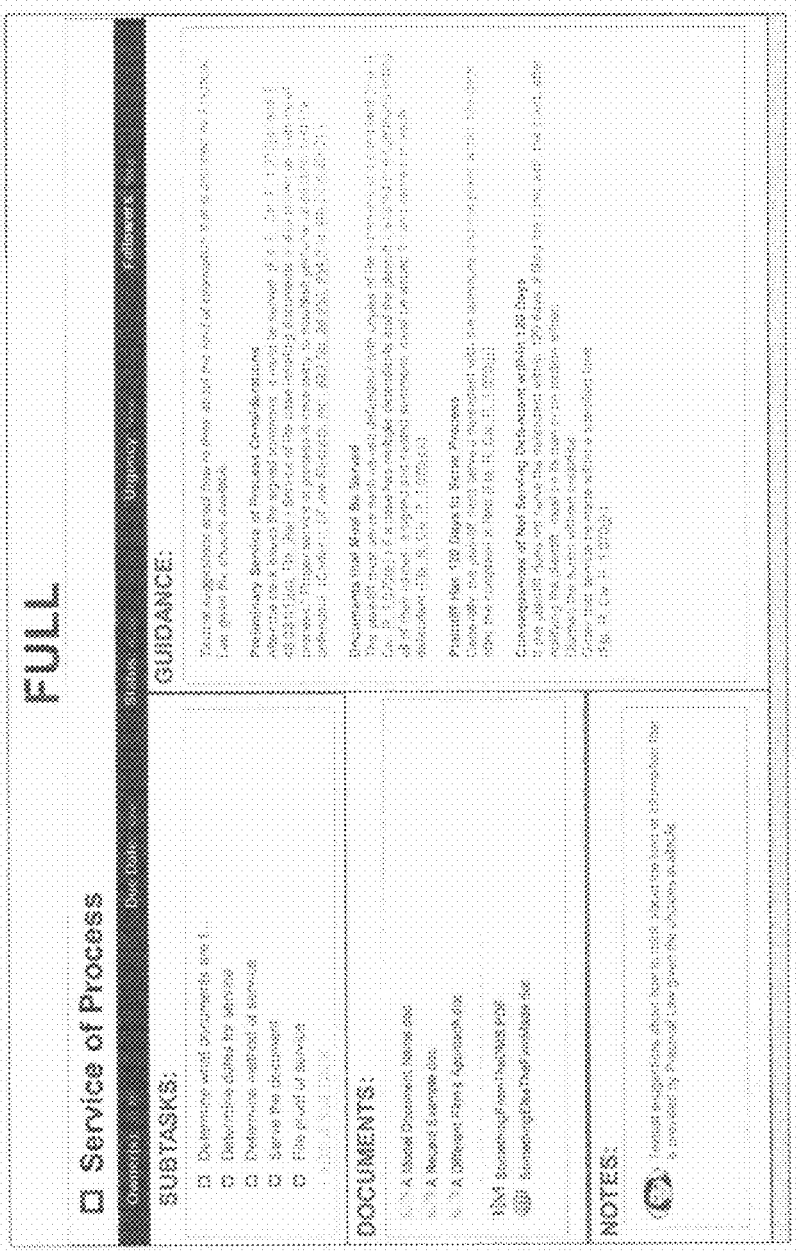
FIG. 14 shows an illustration of exemplary views provided to a user by embodiments of a workflow and practice management system.

As shown generally in FIG. 10, the inventive system may also be configured to provide a tool for setting and modifying administrative entitlements 1002. For example, such a tool may be configured to allow the setting or modification of one or more of service provider permissions, ethical walls, a template approval process, the service providers assigned to a matter, a pricing approval process, a budget approval process, analytics to be applied to the matter and a knowledge reservoir associated with a matter. Such an administrative tool may also or alternatively be configured to search for and manage ethical conflicts between a matter being contemplated and matters already performed.

B. Executing a Matter Plan

After or as a matter plan or template is established, the work begins. Of course, matter plans or templates may be altered at any point during the execution of a matter, subject to the relevant permissions established for making such modifications. Such modifications may be tracked so as to prompt a matter planner of a future matter to include such modifications from the outset when planning a similar matter.

The inventive system may be configured to provide tools 1004 useable by service providers to, for example, manage task lists, set up alerts, set up defaults, create and modify matter plans, access matter analytics, price a matter, view a budget and real-time actuals, plan resources needed for a matter, search for providers with necessary experience, create groups of providers, and/or create and access knowledge from a knowledge reservoir. The inventive system may also be configured to provide service providers a tool 1006 for entering and managing time entries for recording the service providers' time spent on various tasks. In addition, the inventive system may be configured to provide communications tools 1008 for facilitating communication between service providers, with the client, and with knowledge reservoirs associated with the various matters being worked on.

In an aspect, the inventive system may be configured to enable a service provider to manage a task by, for example, creating work product associated with the task, delegating the task to another service provider, setting or modifying a deadline or priority level for the task, setting a progress of the task, etc.

Figure 4:
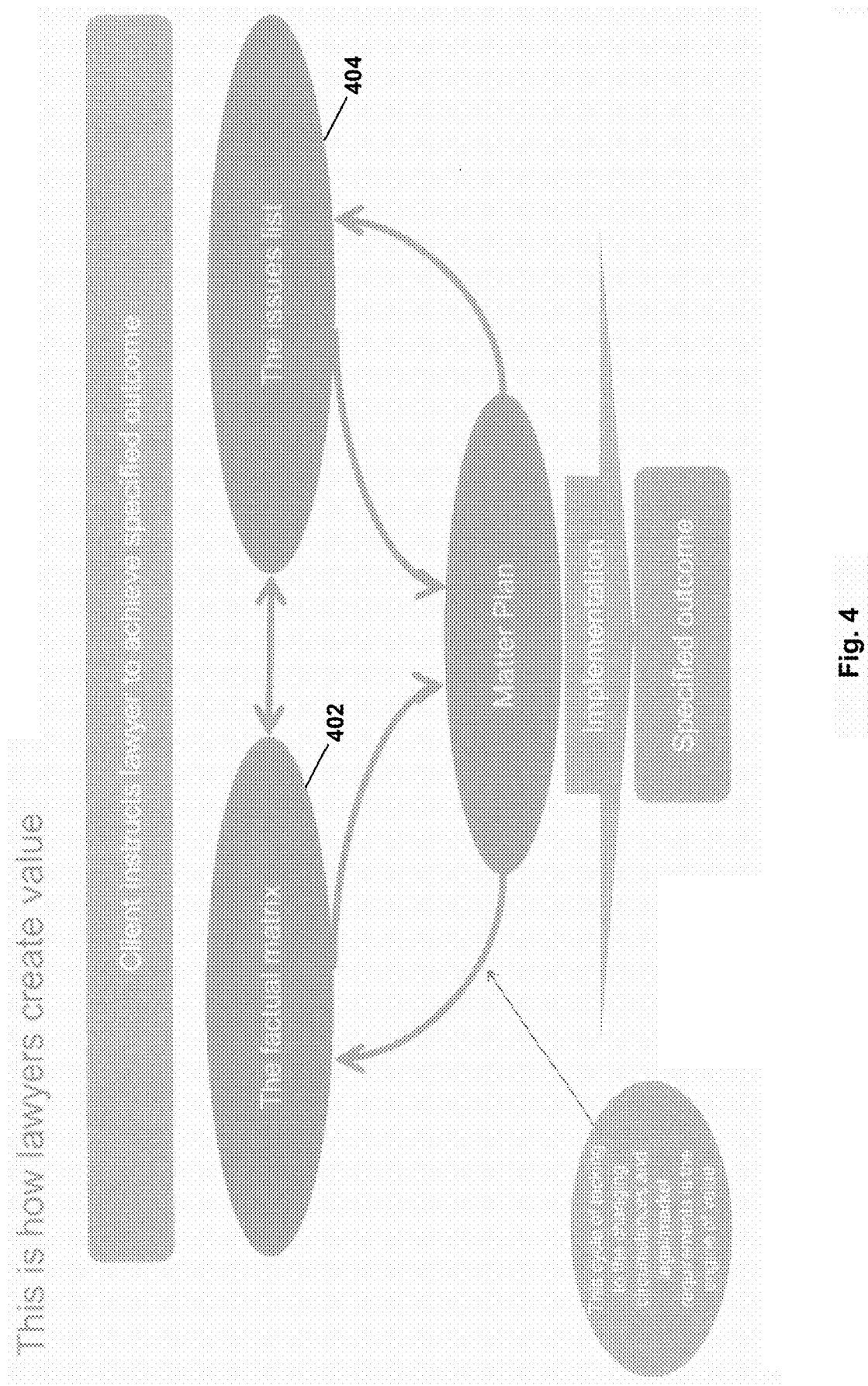
FIG. 4 shows a block diagram illustrating a legal work flow using embodiments of a workflow and practice management system.

As shown generally in FIG. 4, in an embodiment, the inventive system may be configured to establish and maintain a factual matrix 402 and issues list 404 for a matter. In some projects, for example litigation projects, a project's success is reliant upon proving various facts associated with the project. Accordingly, the system's factual matrix and issues list may be provided to assist in identifying and documenting and organizing the evidence necessary to make such a showing. The factual matrix may be intricately tied with the system of tasks described above. For example, in one implementation, each element of the factual matrix or issue on an issues list may be associated with a task to fulfill it. The factual matrix of the inventive system may also be configured to record whether each element of the matrix is known, a best guess, an unknown, etc. The factual matrix may also be used to provide real-time suggestions to a user about whether new tasks should be considered and/or whether previously planned tasks may become obsolete based on the factual development of the project.

In many industries, the deliverables of projects include documents. Accordingly, tasks associated with projects or matters in those industries may relate to documents to be drafted in furtherance of the projects or matters.

Figure 15:
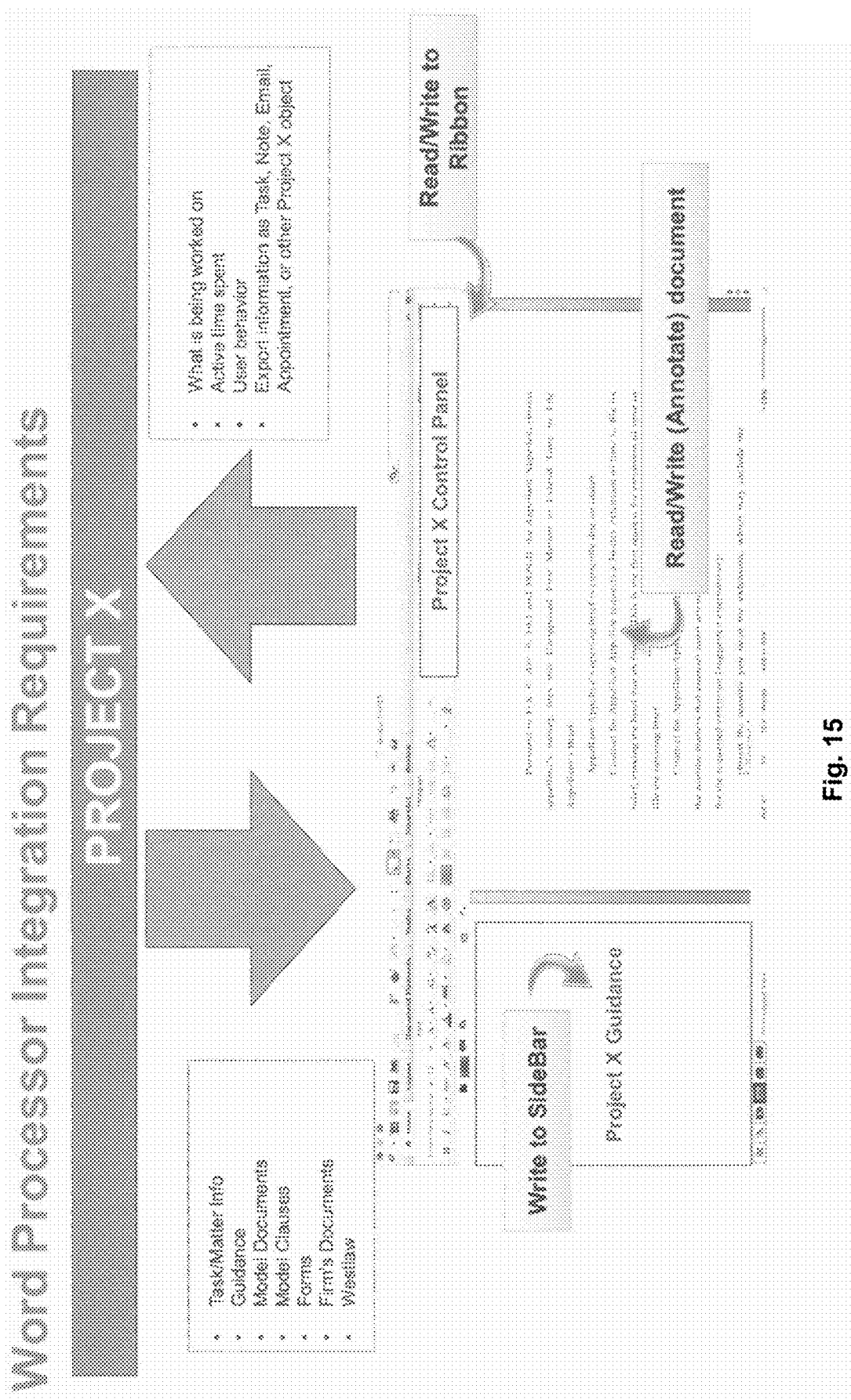
FIG. 15 shows an illustration of exemplary word processor integration tools according to embodiments of a workflow and practice management system.

In one embodiment, the inventive system includes a recommendation engine configured to assist in the drafting of documents. The recommendation engine may be configured with base material from a number of sources including, for example, service providers' own prior content, prior content of others staffed to the project or in the service provider's practice group, prior content associated with other projects for the client, third party databases, etc. In use, the recommendation engine may be configured to automatically or on demand provide suggestions for the phrasing or content of sections of a document being drafted by a service provider. The recommendation may take the form of, or include as a component, a plug in, add-in or integrated component in a separate word processing or communication application (e.g., Microsoft Word or Microsoft Outlook). FIG. 15 shows an illustration of exemplary word processor and communication application integration tools.

In one example, a plug in may be configured to add metadata to a document describing how the document fits into the project, including, for example, an identification of the user who opens or modifies the document and when (including, optionally, for how long), an identification of the matter and task associated with the document, etc. Such metadata may be referenced by a day recreation tool made visible to a user to assist them in determining how long they spend preparing the document as they enter a time record for their activities. In another example, document metadata may be referenced to return a search result of documents relevant to a particular task. In this example, such a search may be conducted across matters. In other words, when working on a new matter, a user may be provided with the capability to search for all previously prepared documents (e.g., a complaint) relating to a particular type of task (e.g., drafting a complaint) from previous matters (e.g., a previous lawsuit). In another example, such a search is conducted automatically upon a user beginning a new document and the result may be displayed to the user together with the new document that they began. In this way, a user may be presented with previously used language options from which to build their new document. Such search results may be presented in their entireties or piecemeal. For example, if a user begins to draft a new complaint and reaches a "Jurisdiction" section of the complaint, the inventive system may present on the same screen to the user previous examples of "Jurisdiction" sections from similar complaints prepared in similar previous matters. The inventive system may provide the user with a button or other mechanism by which to adopt or otherwise copy over such previously used language to the document being drafted.

Alternatively, a recommendation engine may be provided as a stand-alone application, either with or without its own word processing capabilities.

The recommendation engine may also be configured to recommend resources (together with or separate from suggested content) relating to the document or document portion being drafted. For example, if the document being drafted is an employment agreement, the recommendation engine may be configured to alert the attorney drafting the agreement to the existence of a state law governing non-solicitation clauses in the state relevant to the agreement. Although such a statute would be relevant to the content, it would not necessarily be included as content in the agreement.

Figure 9:
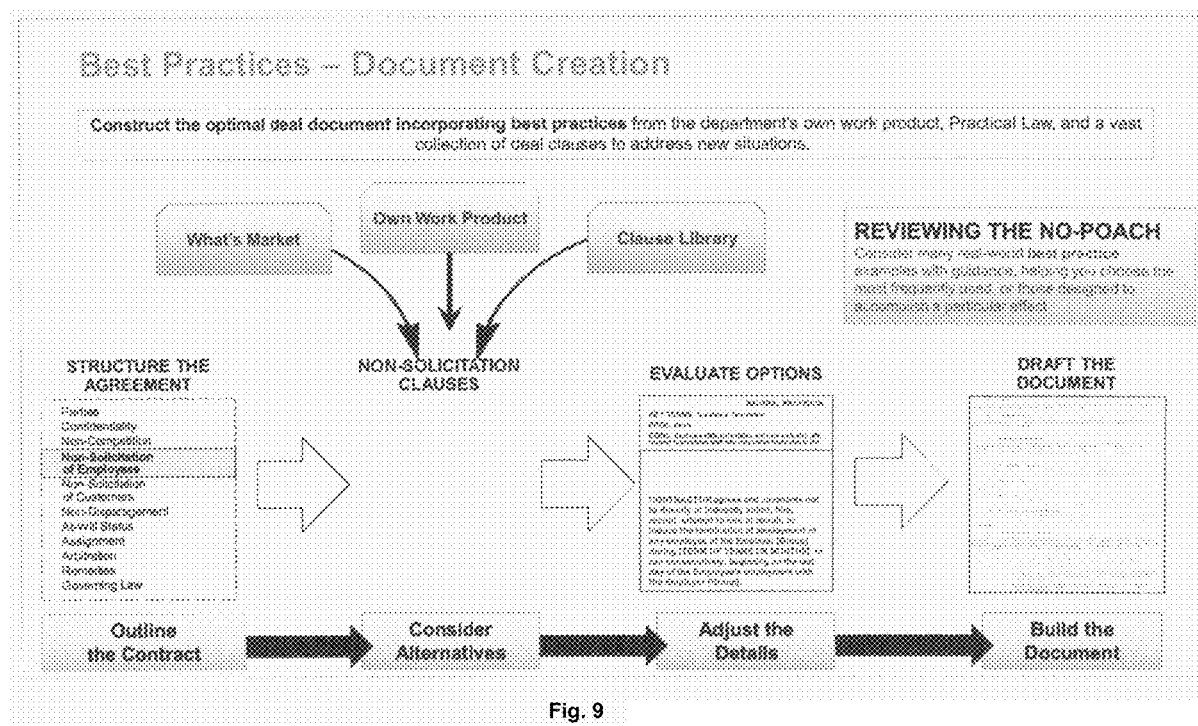
FIG. 9 shows an illustration of exemplary document creation tools according to embodiments of a workflow and practice management system.

Of course, recommendations provided by the recommendation engine may also be for content to include in the document being drafted. In a similar example to the one discussed above involving a complaint, shown generally in FIG. 9, the recommendation engine may alert the attorney drafting an employment agreement to language for a non-solicitation clause used by the same client in a different employment agreement a short time ago. In another example, a recommendation engine may be configured to recommend more than one language or content option for inclusion in the document. Using the example again of an employment agreement, the recommendation engine may be configured to present options for a non-solicitation clause that are pro-employer, pro-employee and neutral, for example. In providing these multiple recommendations, the recommendation engine may be configured to provide an explanation of the benefits and potential pitfalls of each option and/or a listing of other documents containing those recommendations for reference.

In another example, a recommendation engine may be configured to operate on a document that has already been drafted as opposed to being implemented in real-time during the drafting of a document. Such a post-drafting operation may be implemented if, for example, external factors change resulting in a need to review all documents of a certain type for use of a certain content. For example, if a state implements a new non-solicitation law, the recommendation engine may be configured to operate on all employment agreements involving that state to determine whether the language of the agreements include a non-solicitation clause and also optionally whether such clause includes language that may need to be altered as a result of the new law.

Figure 17:
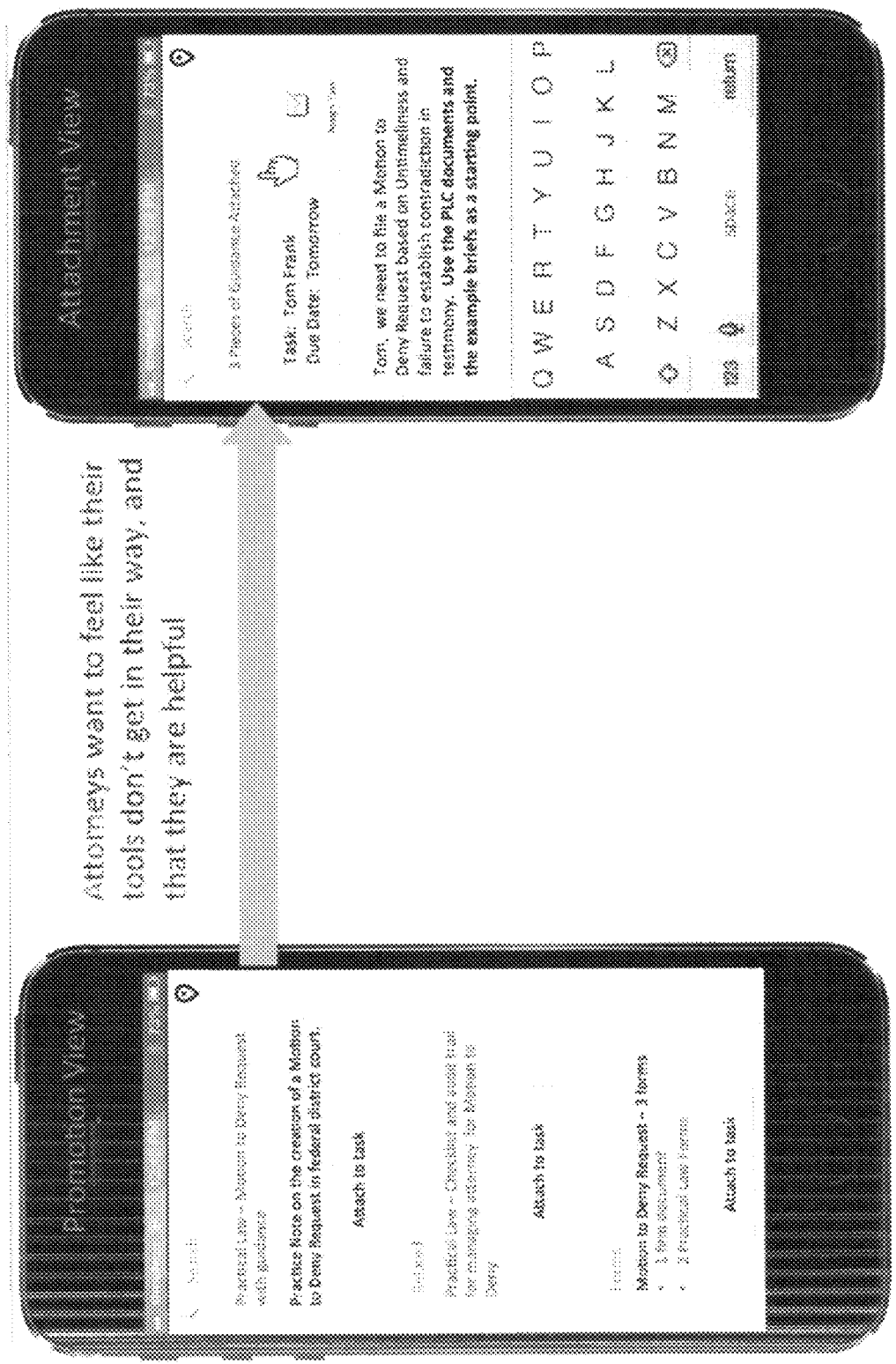
FIG. 17 shows an illustration of more exemplary content recommendation tools according to embodiments of a workflow and practice management system.
Figure 18:
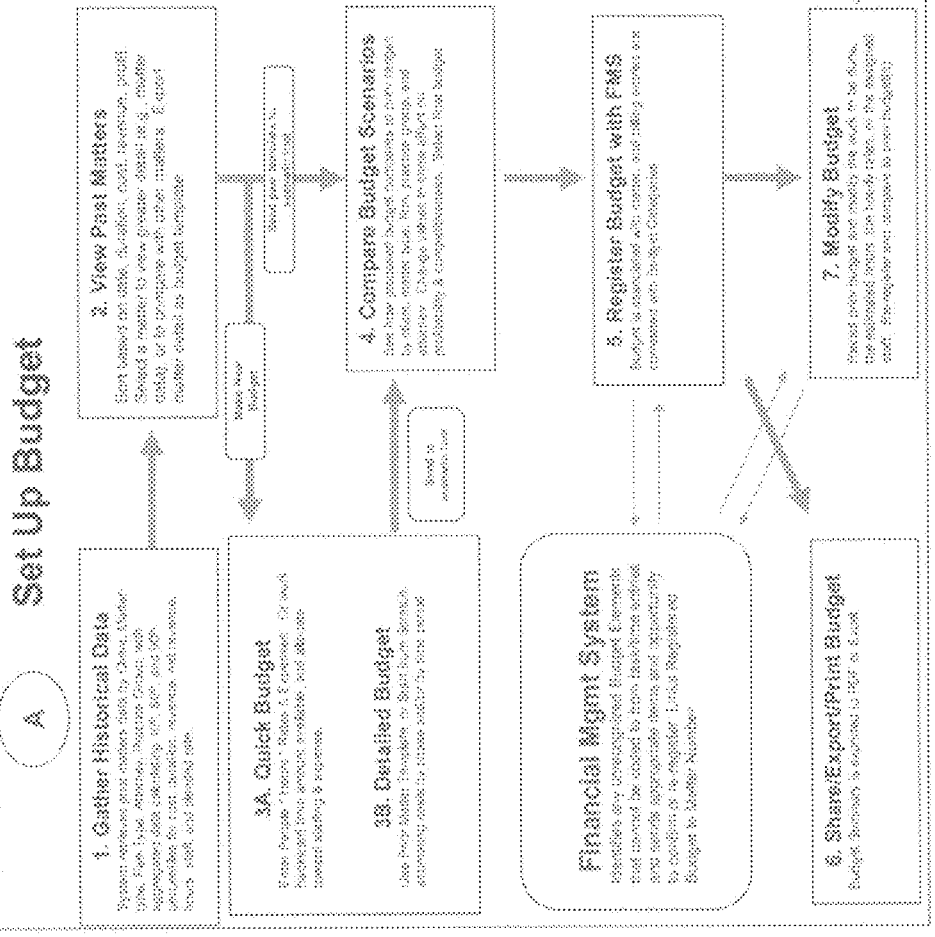
FIG. 18 shows an illustration of exemplary pricing tools according to embodiments of a workflow and practice management system.
Figure 19:
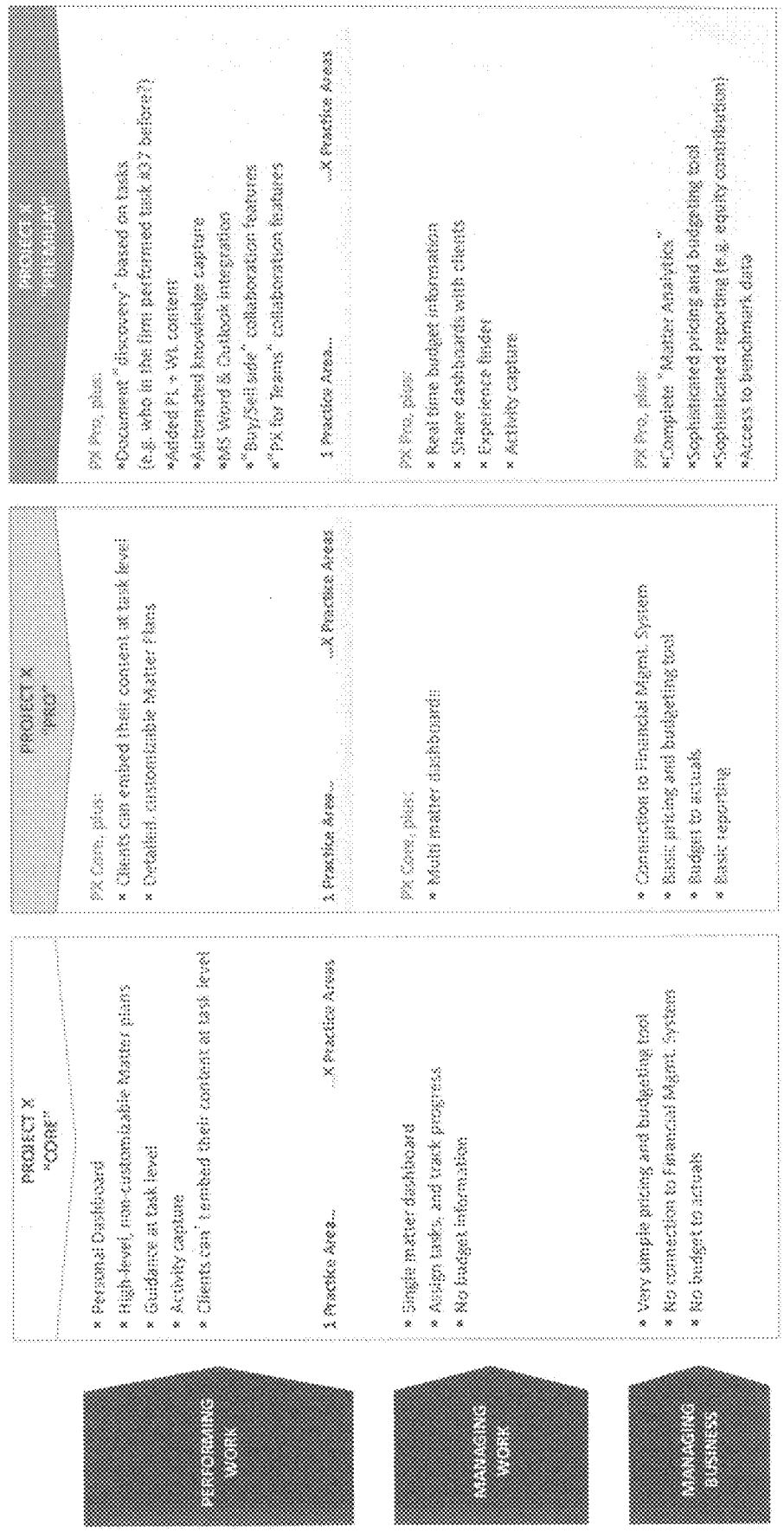
FIG. 19 shows an illustration of exemplary tools included in various embodiments of workflow and practice management systems.

In another aspect, shown generally in FIGS. 16 and 17, the recommendation engine may be configured to provide recommendations as a part of a communication to another person from a service provider. For example, a service provider may draft a communication to their co-worker or to their client on a particular subject and the recommendation engine may suggest (or automatically include) additional relevant resources based on the content of the communication to send together with the communication. For example, the recommendation engine may be configured to provide links to treatises or articles related to the content of the communication along with the content for use by the recipient in case they wish to read more about those topics.

C. Analytics

During the work on a matter or project, or after it is completed, analytics may be performed on aspects of the matter or project relevant to the service provider. The inventive system may be configured to provide an analytics tool for executing such an analysis.

Aspects relevant to the analysis of the success or failure of matters from the service providers' perspective is the profitability, adherence to budget and cost estimates (i.e. budget to actuals), staffing efficiency, completion time, adherence to estimated timelines, success of the strategy adopted, changes made to the initially established strategy (and their success), etc. Each of these parameters may be evaluated by the inventive system, and with a great deal of accuracy and precision. For example, as time is recorded by each individual service provider as being applicable to individual tasks or sub-tasks, reports may be generated based on many different aspects. For example, the analytics tool may be configured to provide an analysis on a time-keeper level of an individual's efficiency working on some tasks versus others. Such an analysis may be recalled the next time that service provider is proposed to be assigned a task in a new matter in order to assist the matter planner with staffing the most efficient service providers for each task. As another example, the analysis tool may be configured to analyze the profitability of one type of matter versus another to help business leaders determine whether to focus their business development efforts towards some matter types and away from others in order to earn more profit.

Figure 20:
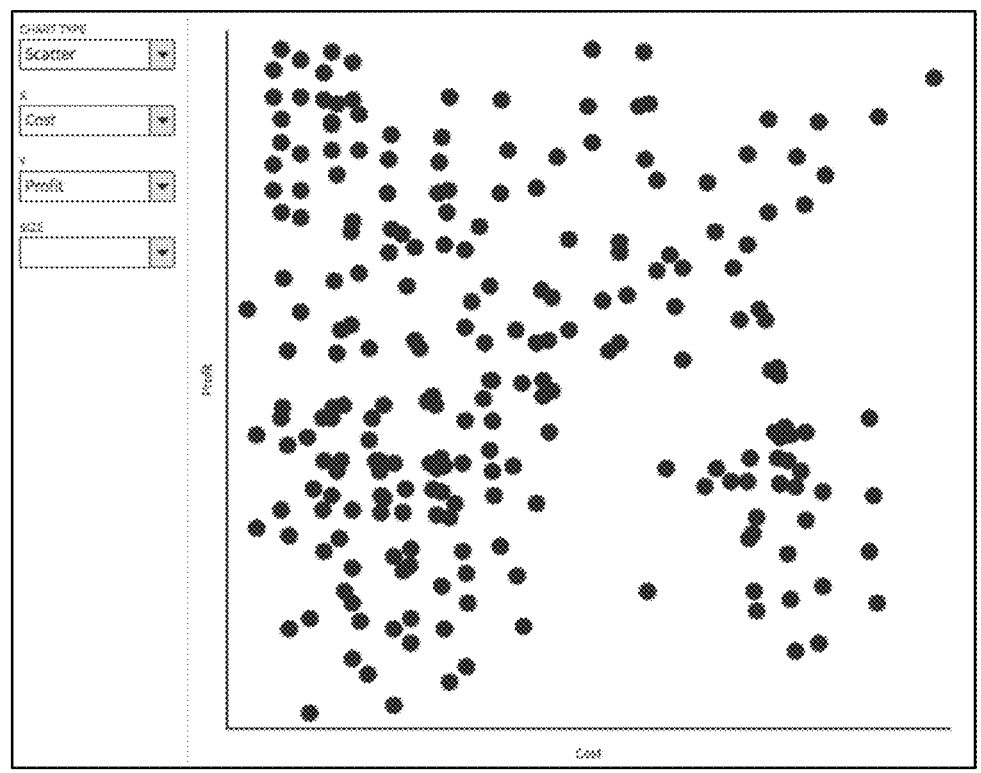
FIGS. 20-23 show illustrations of data plots provided by analytics tools according to various embodiments of a workflow and practice management system.
Figure 21:
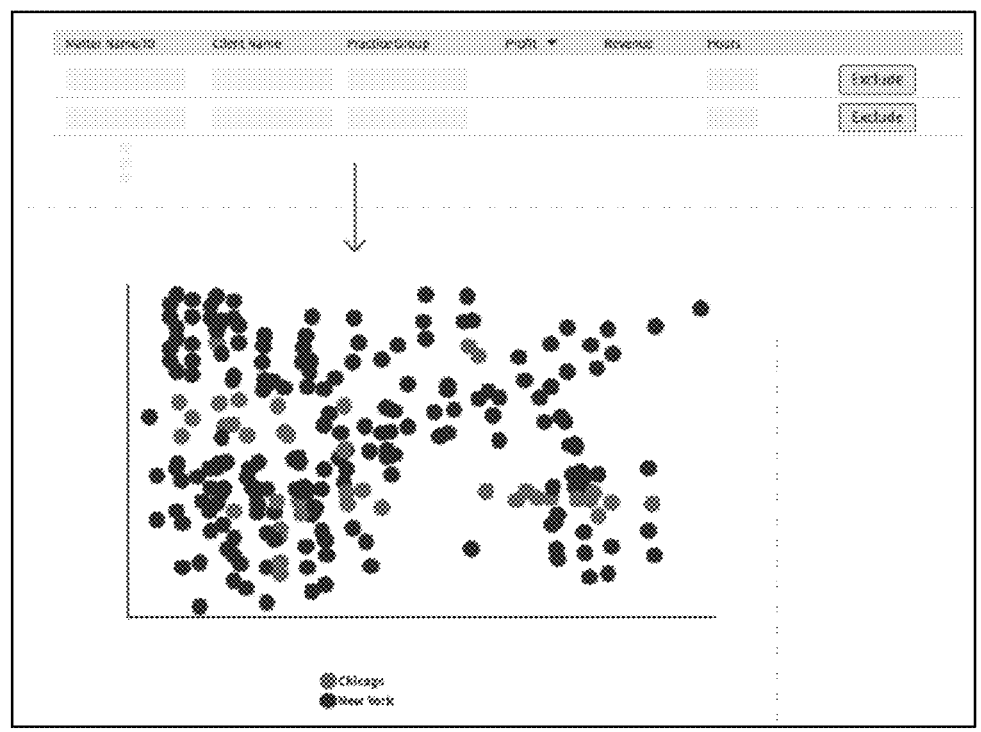
Figure 22:
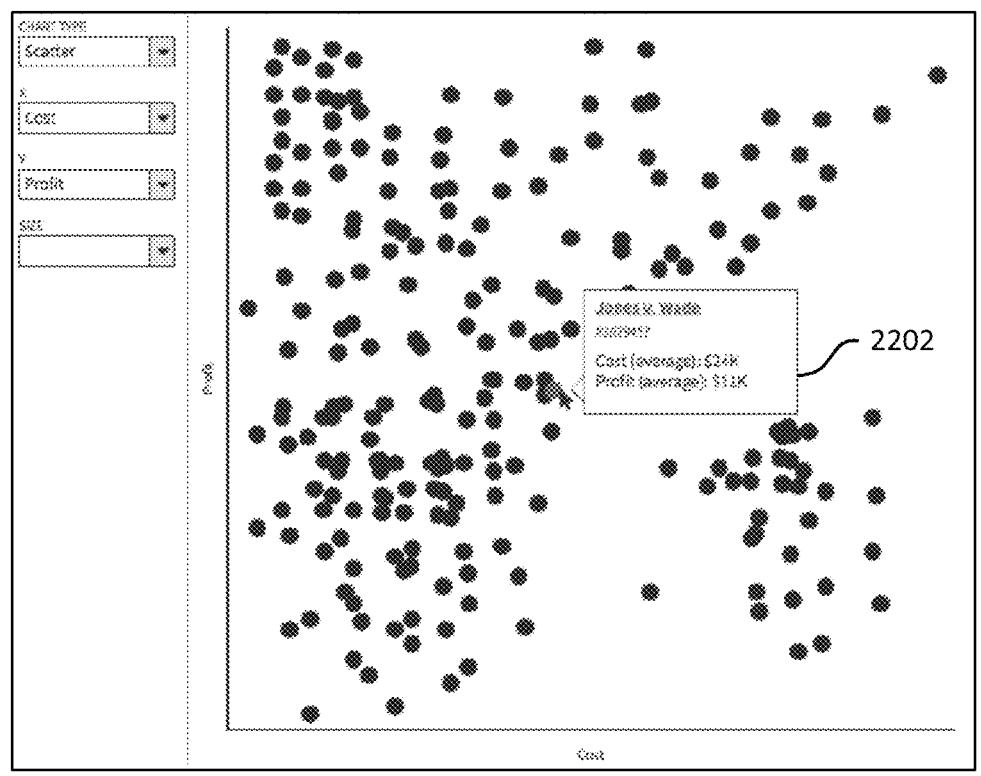
Figure 23:
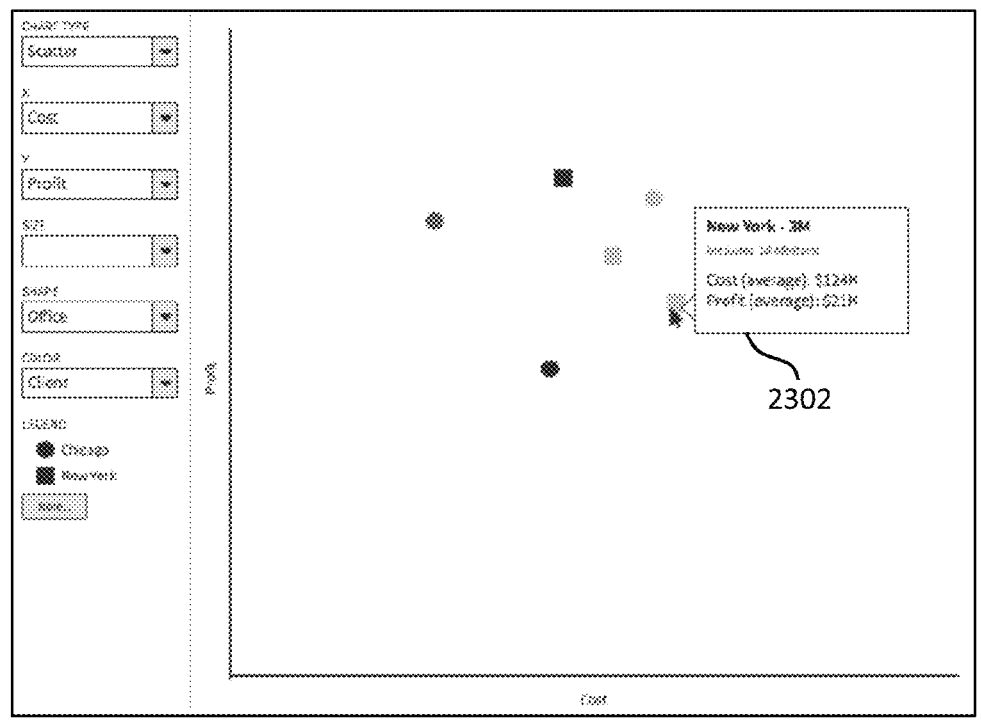

In one embodiment, an analytics tool is configured to provide a static or dynamic graphical representation of the performance of various tasks, matters or projects. In one example, shown in FIG. 20, a scatter plot is configured to display profit (y axis) vs. cost (x axis) information for a plurality of matters. Such a plot may also be configured to display similar information on a more granular task or subtask level. In another example, shown in FIG. 21, an analytics tool is configured to display similar profit vs. cost information as shown in FIG. 20, but in FIG. 21 the information is color coded as to a location in which the work for the matter was primarily done. As shown in FIG. 22, analytics information corresponding to individual matters (or tasks or subtasks) may be configured to be displayed as a "tool tip" or information window 2202 proximate to its corresponding data point on the plot. In still another example, shown in FIG. 23, information displayed on a plot by an analytics tool may be color coded according to location (as in FIG. 21) and may also be coded according to an identification of the service provider's client (coded in the example shown in FIG. 23 as differently shaped data points on the plot). In addition, as shown in FIG. 23, an analytics tool may be configured to aggregate multiple matters (or tasks or subtasks) to a single data point on a plot. For example, as shown in FIG. 23, all twenty four matters for the client "3M" in New York are aggregated into a single data point and the information window 2302 displays average cost and profit information for those matters.

In another example, the analytics tool may be employed to provide a reference to service providers of how long a particular task should take. For example, for junior or less experienced service providers, it may be unclear from their superiors how long they are expected to take to complete a task. Instead of finding out afterwards that they may have spent too much or too little time on a task, the inventive system may provide the junior service provider with guidance, such as an average and/or a range of time that this task and/or similar tasks have taken others (inside and/or outside their organization) in the past.

D. An Exemplary System i. Management System Controller

Figure 5:
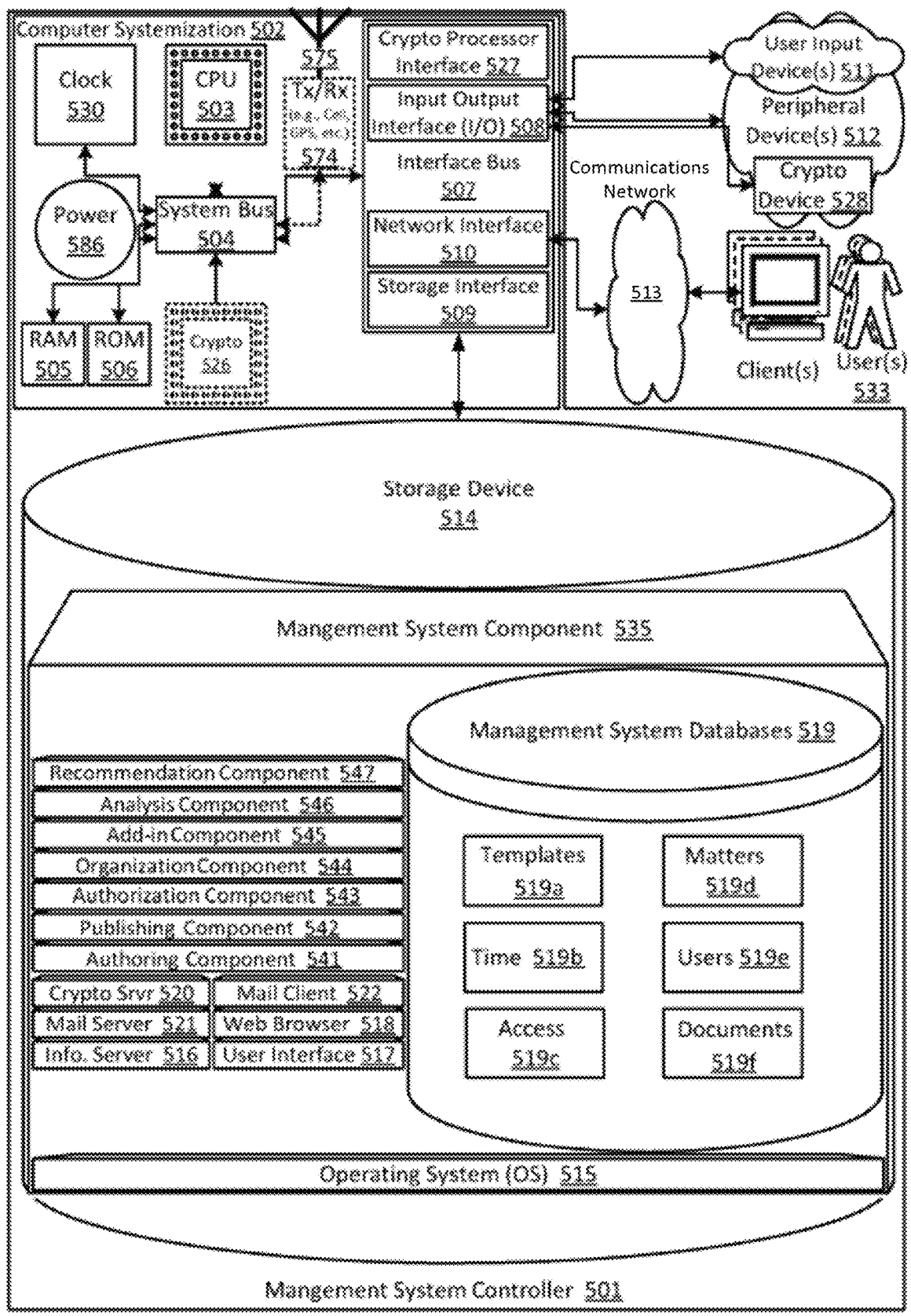
FIG. 5 shows a block diagram illustrating embodiments of a Management System controller.

FIG. 5 shows a block diagram illustrating embodiments of a Management System controller. In this embodiment, the Management System controller 501 may serve to aggregate, process, store, search, serve, identify, instruct, generate, match, and/or facilitate interactions with a computer, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Management System controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Management System controller 501 may be based on computer systems that may comprise, but are not limited to, components such as: a computer systemization 502 connected to memory 529.

ii. Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing Management System controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Management System controller and beyond through various interfaces. Should processing requirements dictate a greater amount speed and/or capacity, distributed processors (e.g., Distributed Management System), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Management System may be achieved by implementing a microcontroller such as CAST's R8051XC2 microcontroller; Intel's MCS 51 (i.e., 8051 microcontroller); and/or the like. Also, to implement certain features of the Management System, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Management System component collection (distributed or otherwise) and/or features may be implemented via the microprocessor and/or via embedded components; e.g., via ASIC, coprocessor, DSP, FPGA, and/or the like. Alternately, some implementations of the Management System may be implemented with embedded components that are configured and used to achieve a variety of features or signal processing.

Depending on the particular implementation, the embedded components may include software solutions, hardware solutions, and/or some combination of both hardware/software solutions. For example, Management System features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Management System features. A hierarchy of programmable interconnects allow logic blocks to be interconnected as needed by the Management System designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the Management System may be developed on regular FPGAs and then migrated into a fixed version that more resembles ASIC implementations. Alternate or coordinating implementations may migrate Management System controller features to a final ASIC instead of or in addition to FPGAs. Depending on the implementation all of the aforementioned embedded components and microprocessors may be considered the "CPU" and/or "processor" for the Management System.

iii. Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the Management System thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

iv. Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the Management System controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Management System), architectures may similarly be employed to pool, load balance, and/or otherwise increase the communicative bandwidth required by the Management System controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the Management System controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the Management System controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the Management System controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

v. Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the Management System controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

vi. Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component (s) 522; cryptographic server component(s) 520 (cryptographic server); the Management System component(s) 535; the Authoring component 541; the Publishing component 542, the Authorization component 543; the Organization component 544; the Add-in component 545; the Analysis component 546; the Recommendation component 547 and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like. Also, while the components are described separately herein, it will be understood that they may be combined and/or subdivided in any compatible manner.

vii. Operating System

The operating system component 515 is an executable program component facilitating the operation of the Management System controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 10/8/7/2003/2000/98/95/3.1/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Management System controller to communicate with other entities through a communications network 513. Various communication protocols may be used by the Management System controller as a subcarrier transport mechanism for interaction, such as, but not limited to: multicast, TCP/IP, UDP, unicast, and/or the like.

viii. Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C#and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Management System controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Management System databases 519, operating systems, other program components, user interfaces, Web browsers, and/or the like.

Access to the Management System database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Management System. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Management System as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

ix. User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

x. Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the Management System enabled nodes. The combined application may be nugatory on systems employing standard Web browsers.

xi. Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C#and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Management System. Mail may also take the form of messages sent from one Management System user to another that is not in the form of traditional email but is more akin to direct messaging or the like conventionally enabled by social networks.

Access to the Management System mail may be achieved through a number of APIs offered by the individual Web server components and/or the operating system.

Also, a mail server may contain, communicate, generate, obtain, and/or provide program component, system, user, and/or data communications, requests, information, and/or responses.

xii. Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

xiii. Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Management System may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the Management System component to engage in secure transactions if so desired. The cryptographic component facilitates the secure accessing of resources on the Management System and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

xiv. The Management System Databases

The Management System databases component 519 may be embodied in one database and its stored data, may be embodied in two or more distinct databases and their stored data, or may be partially or wholly embodied in an unstructured manner. For the purposes of simplicity of description, discussion of the Management System databases component 519 herein may refer to such component in the singular tense, however this is not to be considered as limiting the Management System databases to an embodiment in which they reside in a single database. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Management System database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Management System database is implemented as a data-structure, the use of the Management System database 519 may be integrated into another component such as the Management System component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 may include several included databases or tables 519a-f, examples of which are described above.

In one embodiment, the Management System database 519 may interact with other database systems. For example, employing a distributed database system, queries and data access by a search Management System component may treat the combination of the Management System databases 519, an integrated data security layer database as a single database entity.

In one embodiment, user programs may contain various user interface primitives, which may serve to update the Management System. Also, various accounts may require custom database tables depending upon the environments and the types of clients the Management System may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-f*. The Management System may be configured to keep track of various settings, inputs, and parameters via database controllers.

The Management System database may communicate to and/or with other components in a component collection, including itself, and/or facilities of the like. Most frequently, the Management System database communicates with the Management System component, other program components, and/or the like. The database may contain, retain, and provide information regarding other nodes and data.

xv. The Management Systems

The Management System component 535 is a stored program component that is executed by a CPU. In one embodiment, the Management System component incorporates any and/or all combinations of the aspects of the Management System that was discussed in the previous figures. As such, the Management System affects accessing, obtaining and the provision of information, services, transactions, and/or the like across various communications networks. The features and embodiments of the Management System discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the Management System's features and facilities, and in many cases reduce the costs, energy consumption/requirements, and extend the life of Management System's underlying infrastructure; this has the added benefit of making the Management System more reliable. Similarly, many of the features and mechanisms are designed to be easier for users to use and access, thereby broadening the audience that may enjoy/employ and exploit the feature sets of the Management System; such ease of use also helps to increase the reliability of the Management System. In addition, the feature sets include heightened security as noted via the Cryptographic components 520, 526, 528 and throughout, making access to the features and data more reliable and secure.

The Management System component enabling access of information between nodes may be developed by employing standard development tools and languages such as, but not limited to: Apache components, Assembly, ActiveX, binary executables, (ANSI) (Objective-) C (++), C#and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Management System server employs a cryptographic server to encrypt and decrypt communications. The Management System component may communicate to and/or with other components in a component collection, including itself, and/or facilities of the like. Most frequently, the Management System component communicates with the Management System database, operating systems, other program components, and/or the like. The Management System may contain, communicate, generate, obtain, and/or provide program component, system, user, and/or data communications, requests, and/or responses.

xvi. Distributed Management Systems

The structure and/or operation of any of the Management System node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Management System controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Management System controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm
    .IBMDI.doc/referenceguide295.htm and other parser implementations:

http://publib.boulder.ibm.com/infocenter/tivihelp/v2r1/index.jsp?topic=/com.ibm
    .IBMDI.doc/referenceguide259.htm all of which are hereby expressly incorporated by reference.

E. Conclusion

FIGS. 1 through 23 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for SYSTEMS AND METHODS FOR WORKFLOW AND PRACTICE MANAGEMENT (including the Cover Page, Title, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. For example, aspects may be adapted for video, audio or any other content. While various embodiments and discussions have included reference to applications in the legal industry, it is to be understood that the embodiments described herein may be readily configured and/or customized for a wide variety of other applications and/or implementations.

What is claimed is:

1. A computer implemented method for managing workflow of a service provider, embodied as instructions stored in non-transitory computer memory which, when executed by a computer processor, are configured to:
   receive a first project template specifying one or more tasks to be performed by one or more service providers in connection with a first project, wherein the one or more tasks are correlated with respective portions of a factual matrix describing a set of facts associated with the first project;
   integrate a plug-in program component configured for real-time monitoring of the one or more tasks into a word processing tool for the first project template;

transmit, using an application programming interface (API), a first binary encoded signal associated with a prompt to a graphical user interface of a user computing device associated with at least one of the one or more service providers, wherein the first binary encoded signal is configured to render the prompt via the graphical user interface to inform the at least one of the one or more service providers to perform a particular task specified by the first project template;

recognize, via execution of a recommendation engine by the computer processor, the nature of the particular task and determine a resource associated with the nature of the particular task to facilitate generation of data for the particular task;

configure a first portion of the graphical user interface for rendering of first visual data associated with the resource and a second portion of the graphical user interface for receiving input data related to the particular task;

extract metadata generated by the plug-in program component indicating an amount of time spent by at least one service provider using the word processing tool for the particular task;

configure a third portion of the graphical user interface for rendering of second visual data associated with the extracted metadata, wherein the second visual data provides a human-interpretable representation of the amount of time spent using the word processing tool for the particular task;

receive a time entry from the at least one service provider comprising a recorded amount of time spent by the at least one service provider to perform the particular task, wherein the recorded amount of time related to the time entry is determined based on the metadata generated by the plug-in program component;

store the time entry in a time entry database in association with the first project, wherein the time entry database comprises one or more additional time entries received from other service providers of the one or more service providers, and wherein the one or more additional time entries are associated with the first project;

receive, using the API, a second binary encoded signal transmitted via the graphical user interface of the user computing device, the second binary encoded signal comprising an indication from the at least one service provider that the particular task has been completed, and the second binary encoded signal configured to engage the computer processor to execute one or more instructions to store an update to the factual matrix that the particular task has been completed by the at least one service provider;

based on entries in the factual matrix, configure a fourth portion of the graphical user interface for receiving additional input data related to first project;

receive an indication from a user related to development of a second project;

analyze whether the second project is similar to the first project; and if the second project is similar to the first project, generate, based on the time entries stored in the time entry database in association with the first project, provide to the user an indication of the other service providers of the one or more service providers associated with the time entries associated with the first project.

2. The method of claim 1, wherein the instructions, when executed, are further configured to:

prompt a user to answer one or more questions related to a nature of the first project;

receive answers to the questions from the user; and apply logic to the answers to create the first project template.

3. The method of claim 2, wherein the instructions, when executed, are further configured to store the answers in the factual matrix.

4. The method of claim 1, wherein the instructions, when executed, are further configured to:

if the second project is similar to the first project, provide the second project template to the user in connection with the second project.

5. A computer implemented method for managing workflow of a service provider, embodied as instructions stored in non-transitory computer memory which, when executed by a computer processor, are configured to:

receive a first project template specifying one or more tasks to be performed by one or more service providers in connection with a first project, wherein the one or more tasks are correlated with respective portions of a factual matrix describing a set of facts associated with the first project;

transmit, using an application programming interface (API), a first binary encoded signal associated with a prompt to a graphical user interface of a user computing device associated with at least one of the one or more service providers, wherein the first binary encoded signal is configured to render the prompt via the graphical user interface to inform the at least one of the one or more service providers to perform a particular document drafting task specified by the first project template;

recognize, via execution of a recommendation engine by the computer processor, the nature of the particular document drafting task and, based on such recognition, determine a relevant template of the document to be drafted in a word processing tool;

configure a first portion of the graphical user interface for rendering of first visual data associated with guidance for the particular document drafting task and a second portion of the graphical user interface for receiving input data related to the particular document drafting task;

provide a plug-in program component within the word processing tool to provide real-time monitoring with respect to drafting of the document, wherein the plug-in program component is configured to assist with the recording of a time entry;

extract metadata generated by the plug-in program component indicating an amount of time spent by at least one service provider using the word processing tool for the particular document drafting task;

configure a third portion of the graphical user interface for rendering of second visual data associated with the extracted metadata, wherein the second visual data provides a human-interpretable representation of the amount of time spent using the word processing tool for the particular document drafting task;

receive, using the API, a second binary encoded signal transmitted via the graphical user interface of the user computing device, the second binary encoded signal comprising an indication from the at least one service provider that the particular document drafting task has been completed, and the second binary encoded signal configured to engage the computer processor to execute one or more instructions to store an update in the factual matrix that the particular document drafting task has been completed by the at least one service provider;

based on entries in the factual matrix, configure a fourth portion of the graphical user interface for receiving additional input data related to first project; and receive an indication related to development of a second project.

6. The method of claim 5, wherein the plug-in is configured to provide to the user an indication of how the document being drafted relates to at least one of the particular task and the first project template.

7. The method of claim 5, wherein the plug-in is configured to recognize the nature of content of the document and to recommend at least one resource to the at least one service provider related to the content of the document.

8. The method of claim 1, wherein the prompt and the resource are provided via a web server that provides content to a web browser.

9. The method of claim 1, wherein the instructions, when executed, are further configured to:

receive an indication of a change in an external fact;

analyze whether the external fact is a basis for an aspect of the first project template and whether the change in the external fact requires a change to the first project template; and if a change to the first project template is determined to be required, notify at least one of the one or more service providers about the required change.

10. The method of claim 5, wherein the instructions, when executed, are further configured to:

receive an indication of a change in an external fact after commencement of the particular document drafting task;

analyze whether the external fact relates to an aspect of the document drafted in connection with the particular document drafting task and whether the change in the external fact requires a change to said document; and if a change to said document is determined to be required, notify at least one of the one or more service providers about the required change.

11. The method of claim 5, wherein the template of the document to be drafted that is provided to the at least one service provider is a previously drafted document identified on the basis that metadata stored in connection with said previously drafted document indicates it was drafted in connection with a task similar to the one for which the document to be drafted is being drafted.

12. A computer implemented method for managing workflow of a service provider, embodied as instructions stored in non-transitory computer memory which, when executed by a computer processor, are configured to:

receive a first project template specifying one or more tasks to be performed by one or more service providers in connection with a first project, wherein the one or more tasks are correlated with respective portions of a factual matrix describing a set of facts associated with the first project;

transmit, using an application programming interface (API), a first binary encoded signal associated with a prompt to a graphical user interface of a user computing device associated with at least one of the one or more service providers, wherein the first binary encoded signal is configured to render the prompt via the graphical user interface to inform the at least one of the one or more service providers to perform a particular document drafting task specified by the first project template;

configure a first portion of the graphical user interface for rendering of first visual data associated with guidance for the particular document drafting task and a second portion of the graphical user interface for receiving input data related to the particular document drafting task;

initialize a plug-in program component within a word processing tool to provide real-time monitoring with respect to drafting a document in satisfaction of the particular document drafting task, wherein the plug-in program component is configured to assist with the recording of a time entry;

extract metadata generated by the plug-in program component integrated indicating an amount of time spent by at least one service provider using the word processing tool for the particular drafting task;

configure a third portion of the graphical user interface for rendering of second visual data associated with the extracted metadata, wherein the second visual data provides a human-interpretable representation of the amount of time spent using by the word processing tool for the particular drafting task;

identify, on the basis of other metadata stored in association with previously drafted documents, at least one document previously drafted in connection with tasks associated with a second project different from the first project, the tasks similar to the particular document drafting task;

identify a particular portion of the document being drafted;

present to the at least one service provider at least one previously drafted document portion from the at least one document previously drafted in connection with tasks associated with the second project similar to the particular document drafting task corresponding to the particular portion of the document being drafted;

receive, using the API, a second binary encoded signal transmitted via the graphical user interface of the user computing device, the second binary encoded signal comprising an indication from the at least one service provider that the particular document drafting task has been completed, and the second binary encoded signal configured to engage the computer processor to execute one or more instructions to store an update in the factual matrix that the particular document drafting task has been completed by the at least one service provider;

based on entries in the factual matrix, configure a fourth portion of the graphical user interface for receiving additional input data related to first project; and receive an indication related to development of a third project.

13. The method of claim 12, wherein:

at least two documents are identified that were previously drafted in connection with tasks similar to the particular document drafting task; and at least two previously drafted document portions that are different from one another are presented to the at least one service provider from the at least two documents identified as being previously drafted in connection with tasks similar to the particular document drafting task.

* * * * *